United States Patent [19]

Sakai et al.

[11] Patent Number: 5,539,902
[45] Date of Patent: Jul. 23, 1996

[54] VECTOR DATA PROCESSING APPARATUS WHEREIN A TIME SLOT FOR ACCESS TO A BANK OF VECTOR REGISTERS IS ASSIGNED BASED ON MEMORY ACCESS TIME INFORMATION

[75] Inventors: Kenichi Sakai, Yokohama; Kazushi Sakamoto; Shoji Nakatani, both of Kawasaki, all of Japan

[73] Assignee: Fujitsu Limited, Kanagawa, Japan

[21] Appl. No.: 460,390

[22] Filed: Jun. 2, 1995

Related U.S. Application Data

[63] Continuation of Ser. No. 141,589, Oct. 27, 1993, abandoned, which is a continuation of Ser. No. 967,565, Oct. 28, 1992, abandoned, which is a continuation of Ser. No. 362,742, Jun. 7, 1989, abandoned.

[30] Foreign Application Priority Data

Jun. 7, 1988 [JP] Japan ................................. 63-140298
Jun. 7, 1988 [JP] Japan ................................. 63-140299

[51] Int. Cl.⁶ ............................................. G06F 13/372
[52] U.S. Cl. .......................... 395/550; 395/297; 395/304; 395/405; 395/483; 395/484; 395/495; 395/496; 395/826; 395/865
[58] Field of Search ..................................... 395/425, 550, 395/800, 297, 304, 405, 483, 484, 495, 496, 826, 865

[56] References Cited

U.S. PATENT DOCUMENTS

| | | | |
|---|---|---|---|
| 4,435,765 | 3/1984 | Uchida et al. | 395/550 |
| 4,507,728 | 3/1985 | Sakamoto et al. | 395/375 |
| 4,617,625 | 10/1986 | Nagashima et al. | 395/800 |
| 4,665,479 | 5/1987 | Oinaga | 395/800 |
| 4,680,730 | 7/1987 | Omoda et al. | 395/496 |
| 4,755,931 | 7/1988 | Abe | 395/800 |
| 4,782,441 | 11/1988 | Inagami et al. | 395/800 |
| 4,791,555 | 12/1988 | Garcia et al. | 395/800 |
| 4,875,161 | 10/1989 | Lahti | 395/484 |
| 4,980,817 | 12/1990 | Fossum et al. | 395/800 |
| 5,134,695 | 7/1992 | Ikeda | 395/405 |
| 5,367,654 | 11/1994 | Furukawa et al. | 395/485 |

*Primary Examiner*—Ken S. Kim
*Attorney, Agent, or Firm*—Staas & Halsey

[57] ABSTRACT

A vector data processing apparatus having a set of vector registers, one or more memory access pipelines, and one or more composite calculation pipelines, wherein the vector registers consist of a plurality of banks, and each bank is independently accessible. Each of the pipelines can cyclically access each of the banks of the vector registers when one or more of a predetermined number of time slots, through each of which time slots the access is carried out, are assigned to an instruction using the pipeline. Immediately when a memory access instruction is received, a vector unit control circuit, which controls operations of the vector data processing apparatus, assigns a time slot for a newly-detected memory access instruction using a memory access pipeline, if it is determined that the memory access pipeline is available based on the pipeline operation status flags, and that the time slot is available based on the detected status of the predetermined number of time slots. Further, when a composite calculation instruction is received, the vector unit control circuit assigns one or more time slots .for the newly-detected composite calculation instruction using a composite calculation pipeline, if it is determined that the composite calculation pipeline is available based on the pipeline operation status flags, and that time slots are available based on the detected status of the predetermined number of time slots.

3 Claims, 22 Drawing Sheets

Fig. 2

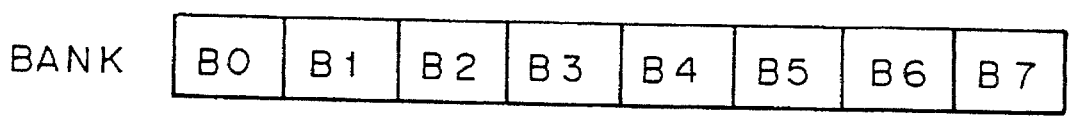
Fig. 5
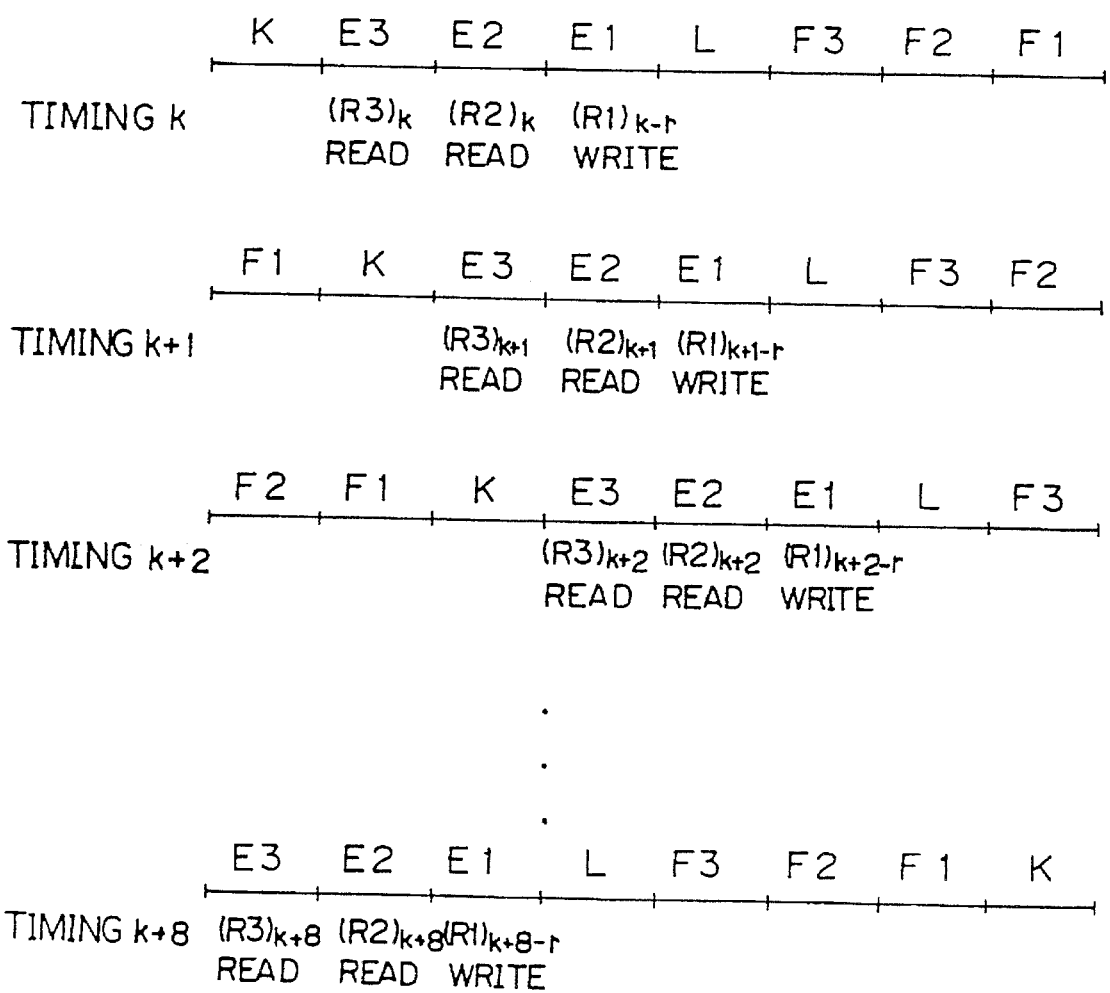

Fig. 15

| START TIMING | MODEL I (T = 25 τ) | MODEL II (T = 27 τ) |
|---|---|---|
| F 1 | K | L |
| . . | . | . |
| F 3 | L | K |
| . | . | . |
| E 1 | K | L |
| . | . | . |
| E 3 | L | K |
| . | . | . |
| . | . | . |
| . | . | . |

Fig. 19
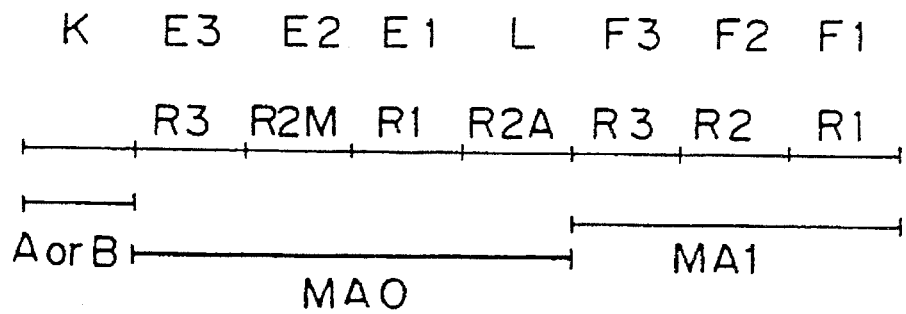
Fig. 20
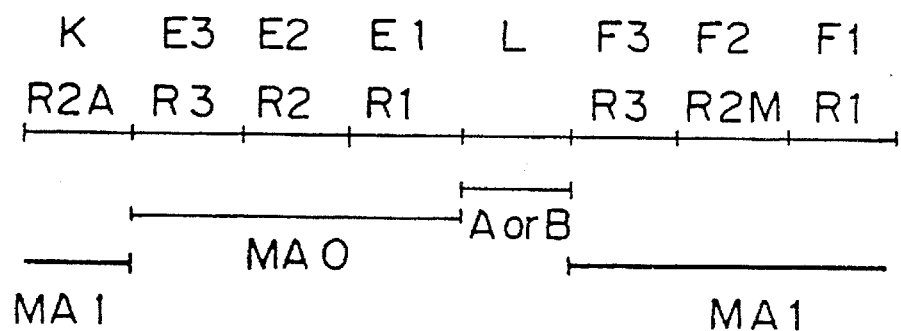
Fig. 21
$$A = B \times C + D$$
$$\downarrow \quad \downarrow \quad \downarrow \quad \downarrow$$
$$R1 = R2M \times R3 + R2A$$

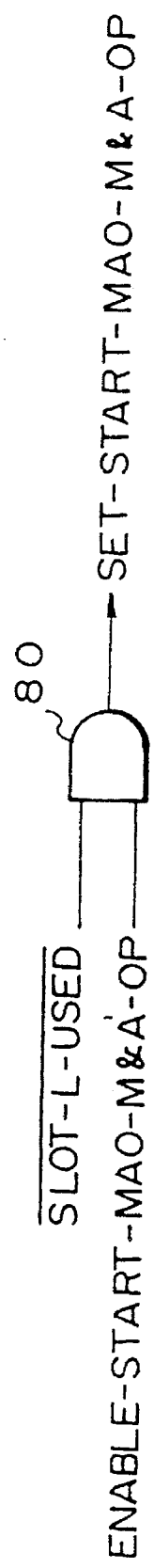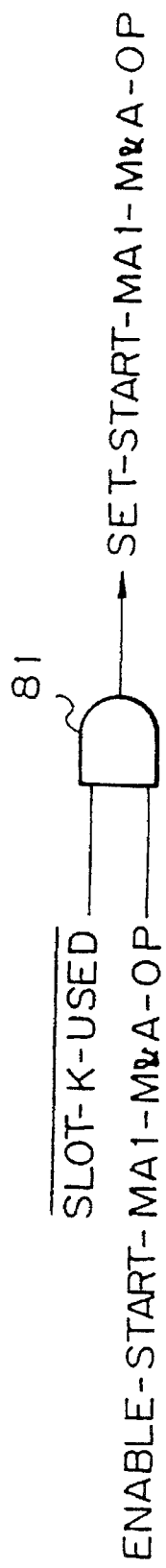

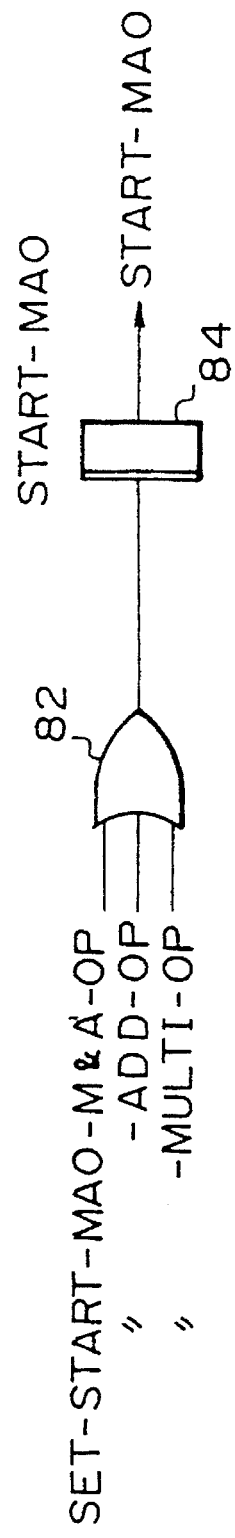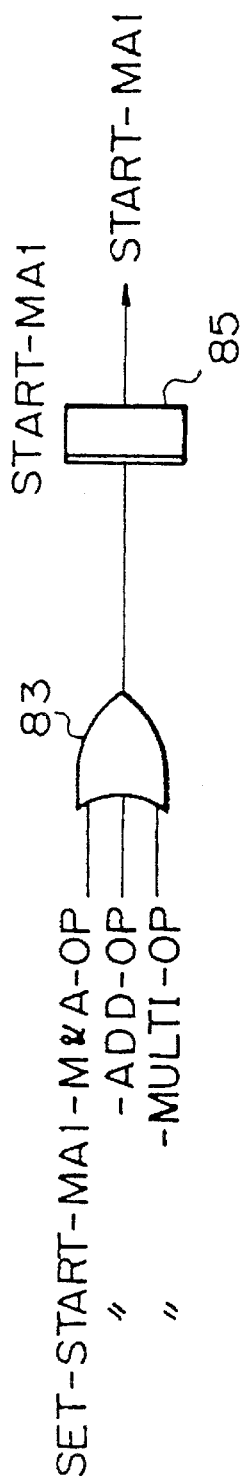

Fig. 30
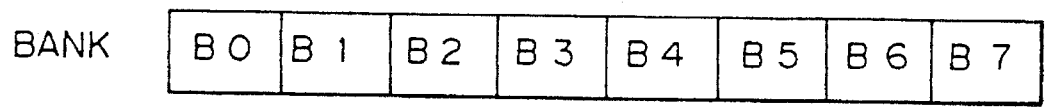
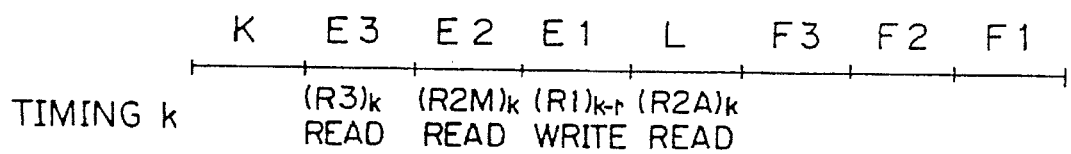
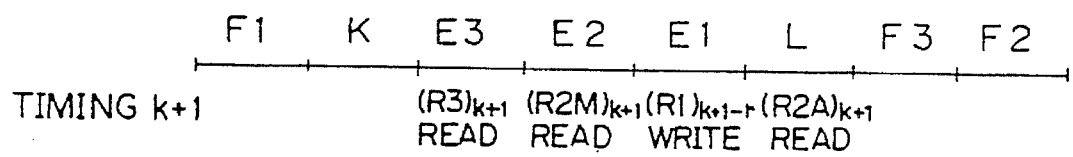
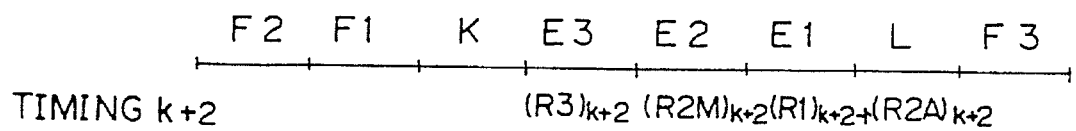
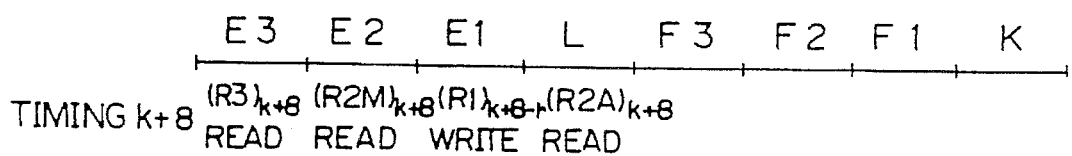

VECTOR DATA PROCESSING APPARATUS WHEREIN A TIME SLOT FOR ACCESS TO A BANK OF VECTOR REGISTERS IS ASSIGNED BASED ON MEMORY ACCESS TIME INFORMATION

This application is a continuation of U.S. patent application Ser. No. 08/141,589, filed on Oct. 27, 1993, now abandoned, which is a File-Wrapper Continuation of U.S. patent application Ser. No. 07/967,565, filed on Oct. 28, 1992, now abandoned, which is a File-Wrapper Continuation of U.S. patent application Ser. No. 07/362,742, filed on Jun. 7, 1989, now abandoned.

BACKGROUND OF THE INVENTION (1) Field of the Invention

The present invention relates to a vector data processing apparatus which carries out a vector calculation.

To increase speed in data processing in computer systems, pipelining operations are utilized. The pipelining operation is, in particular, effective in a vector data processing, e.g., a vector data calculation, $A(i)+B(i)=C(i)$, $(i=1-n)$.

In particular, in scientific or technological calculations, loop calculations are frequently carried out. The loop calculations can be transformed into vector calculations.

In high-speed data processing system, such as a supercomputer, a vector data processing apparatus is provided to carry out vector data processing, in addition to a scalar data processing apparatus which is provided to carry out scalar data processing.

(2) Description of the Related Art

FIG. 1 shows an outline of the construction of an example of data processing apparatus comprising a vector data processing apparatus.

In FIG. 1, reference numeral 61 denotes a main storage unit (MSU), 62 denotes a memory control unit (MCU), 63 denotes a scalar unit (SU), 64 denotes a vector unit (VU), 65 denotes a vector execution unit (VEU), 66 denotes a vector control unit (VCU), 650 and 651 each denote a load/store pipeline, 652 denotes a set of vector registers (VR), 653 denotes an addition pipeline, 654 denotes a multiplier pipeline, 655 denotes a divider pipeline, 656 denotes an adder-multiplier pipeline, 657 denotes an adder-divider pipeline, 658 denotes a set of mask registers (MR), 659 denotes a logical sum pipeline, 660 denotes a logical multiplication pipeline, and 661 denotes control lines.

The scalar unit (SU) 63 reads out an instruction from the main storage unit (MSU) 61 under the control of the memory control unit (MCU) 62.

If the instruction is a scalar instruction, i.e., other than a vector instruction, the scalar unit (SU) 63 carries out the scalar instruction. If the instruction is a vector instruction, the scalar unit (SU) 63 sends the vector instruction to the vector control unit (VCU) 66 in the vector unit (VU) 64.

The vector instruction is an instruction which instructs an execution of a vector data processing operation, for example, an addition of two vector data, a multiplication of two vector data, and the like.

When the vector control unit (VCU) 66 receives a vector instruction, the vector control unit (VCU) 66 makes the vector execution unit (VEU) 65 execute the received vector instruction. The vector control unit (VCU) 66 controls all operations carried out in the vector execution unit (VEU) 65.

The load/store pipelines 650 and 651 are memory access pipelines through each of which a data transfer operation is carried out between the main storage unit (MSU) 61 and banks (explained later) of the set of vector registers (VR) 652, i.e., data is read out from the main storage unit (MSU) 61 under the control of the memory control unit (MCU) 62 through the load/store pipelines 650 or 651, and is then written into the vector registers (VR) 652.

In addition, when storing data in the vector registers (VR) 652 from the main storage unit (MSU) 61, data held in an address (explained later) of the vector registers (VR) 652 is read out, and then is transferred through one of the load/store pipelines 650 and 651 to the main storage unit (MSU) 61 under the control of the memory control unit (MCU) 62.

Although the detailed construction is not shown, the main function of the load/store pipelines 650 or 651 is to align a plurality of elements of vector data which have been read out from the main storage unit (MSU) 61, to write the elements in the corresponding banks of the vector registers (VR) 652, or to transfer aligned data which have been read out from the banks of the vector registers (VR) 652 to the main storage unit (MSU) 61.

The adder pipeline 653, the multiplier pipeline 654, the divider pipeline 655, adder-multiplier pipeline 656, and the adder-divider pipeline 657, are calculation pipelines, each of which reads out data from one or more banks of the vector registers (VR) 652, carries out a corresponding calculation, (for example, the adder pipeline 653 carries out an addition) using the data, and writes a result of the calculation into one bank of the vector registers (VR) 652.

The above corresponding calculation of the adder-multiplier pipeline 656 is a composite calculation of an addition and a multiplication, and the above corresponding calculation of the adder-divider pipeline 657 is a composite calculation of an addition and a division.

Similarly, mask data, which is used for a masking operation of vector data, is transferred between the main storage unit (MSU) 61 and the set of mask registers (MR) 658 through the load/store pipeline 650 or 651.

The logical sum pipeline 659, and the logical multiplication pipeline 660, are logical calculation pipelines for mask data, each of which reads out mask data from one or more banks (explained later) of the mask register (MR) 658, carries out a logical calculation, (for example, the logical sum pipeline 659 carries out a logical sum operation) using the mask data, and writes a result of the logical calculation into one bank of the mask register (MR) 658.

Figure 2:
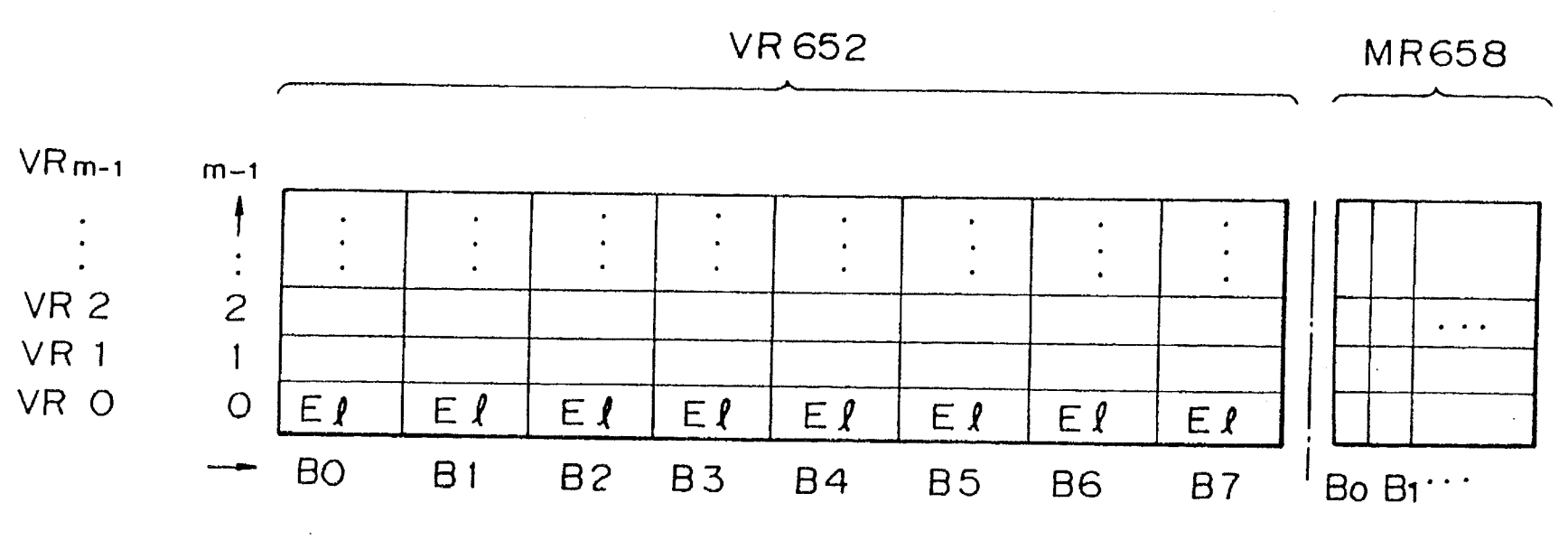

FIG. 2 shows a detailed construction of the set of vector registers (VR) 652 and the set of mask registers (MR) 658.

The set of vector registers shown in FIG. 2 consists of m (m is an integer) registers, each of which registers corresponds to an address, and each register is divided into eight banks, B0, B1,–B7. In each bank of each register, an element of vector data is held, and each bank is simultaneously and independently accessible for each of the calculation pipelines and the memory access pipelines 650, 651, 653 to 657, and 659, and 660.

Similarly, the set of mask registers shown in FIG. 2 consists of m registers, each register corresponds to an address, and each register is divided into eight banks, B0, B1,–B7. In each bank of each register, an element (one bit) of mask data is held, and each bank is simultaneously and independently accessible for each of the logical calculation pipelines 659 and 660, and the memory access pipelines 650 and 651.

Each pipeline can access a bank of the set of vector registers (VR) 652 during an assigned time slot, which is called a bank slot.

As shown in FIG. 3, eight bank slots, K, E3, E2, E1, L, F3, F2, and F1, are defined corresponding to the eight banks, B0, B1,–B7 of the set of vector registers (VR) 652, and each of the bank slots K and L is assigned for a memory access pipeline, i.e., the load/store pipeline 650 or 651, three bank slots of E3, E2, and E1, are assigned for a simple (non-composite) calculation pipeline such as the adder pipeline 653, the multiplier pipeline 654, or the divider pipeline 655, and the other three bank slots of F3, F2, and F1, are assigned for another simple calculation pipeline.

The pipeline for which the bank slot is assigned can cyclically access each bank of the set of vector registers (VR) 652, as shown in FIG. 4.

Namely, for example, when the bank slot K is assigned for the load/store pipeline 650, the load/store pipeline 650 can access the bank B0 of the set of vector registers (VR) 652 at the timing 0, the bank B1 at the timing 1, - - - , the bank B7 at the timing 7, and the bank B0 again at the timing 8 - - -.

When the three bank slots of E3, E2, and E1, are assigned for a non-composite pipeline, for example, an adder pipeline 653, the adder pipeline 653 can access the banks, B1, B2, and B3 at the timing 0, the banks, B2, B3, and B4 at the timing 1, - - - , the banks, B0, B1, and B2 at the timing 7, and the banks, B1, B2, and B3 again at the timing 8, - - -.

In the above case, the non-composite calculation pipeline such as the adder pipeline 653, can read data used for its own calculation from each bank of the set of vector registers (VR) 652 through the bank slots E3 and E2, and write the result of the calculation in each bank of the set of vector registers (VR) 652 through the bank slots E1. The addresses of the registers during the above accesses are controlled by the vector control unit (VCU) 66.

FIG. 5 shows an example of the access timing and the read/write data by a non-composite calculation pipeline for which the bank slots E3, E2, and E1 are assigned.

In FIG. 5, it is assumed that the non-composite calculation pipeline carries out a calculation, $$(R3)_k * (R2)_k = (R1)_k,$$

where $(R3)_k$ and $(R2)_k$ each denotes an element of vector data which is used in a calculation carried out in the above non-composite calculation pipeline, "*" indicates a type of the calculation, e.g., "+" indicates an addition in the adder pipeline 653, or "x" indicates a multiplication in the multiplier pipeline 654, $(R1)_k$ denotes a result of the above calculation using the above element data $(R3)_k$ and $(R2)_k$.

As shown in FIG. 5, element data $(R3)_k$ and $(R2)_k$ are each read from the banks B1 and B2 through the bank slots E3 and E2, respectively, at the timing k. Since it takes a few or several cycles to obtain the above calculation result $(R1)_k$ from the timing of reading the above element data $(R3)_k$ and $(R2)_k$, a calculation result $(R1)_{k-r}$ obtained from the element data $(R3)_{k-r}$ and $(R2)_{k-r}$ which are read in the previous timing k–r, is written in the bank B3 through the bank slot E1 at the timing k.

Then, at the next timing k+1, element data $(R3)_{k+1}$ and $(R2)_{k+1}$ are each read from the banks B2 and B3 through the bank slots E3 and E2, respectively, and a calculation result $(R1)_{k-r+1}$ obtained from the element data $(R3)_{k-r+1}$ and $(R2)_{k-r+1}$ which are read in the previous timing k–r+1, is written in the bank B4 through the bank slot E1 at the timing k+1.

Thus, pipeline operation for vector data calculation, is carried out in a calculation pipeline for which a necessary number of bank slots are assigned.

FIG. 6 shows an example of a timing of bank slot assignment when a calculation instruction is received.

When an addition instruction is received the adder pipeline 653 obtains the next available successive three bank slots to start reading of element data from an instructed bank of the set of vector registers (VR) 652 most quickly.

For example, when an addition instruction is received, if the bank slot which is accessible to the bank wherein the element data which should be first read for the execution of the addition instruction, is F2, the next available successive three bank slots E1, E2, and E3, are assigned for the corresponding addition calculation, i.e., for the adder pipeline 653. Then, the corresponding calculation result is written in the bank slot E1 in the next rotation of the eight bank slots.

FIG. 7 shows an example of a timing of bank slot assignment when a vector load instruction is received.

The memory access instruction executed in the vector execution unit (VEU) 65, is a vector load instruction or a vector store instruction. The bank slot K or L is assigned for a memory access pipeline for execution of load or vector store instructions.

The vector store instruction instructs a vector data transfer operation from each bank of the set of vector registers (VR) 652 to the main storage unit (MSU) 61 through a memory access pipeline, i.e., the load/store pipeline 650 or 651.

The execution of a vector store instruction starts from a reading operation of a bank of the set of vector registers (VR) 652. Therefore, similar to the above calculation instruction, when a vector store instruction is received, the next available bank slot K or L, is assigned for the corresponding load/store pipeline.

On the other hand, the vector load instruction instructs a data transfer operation from the main storage unit (MSU) 61 to each bank of the set of vector registers (VR) 652 through a memory access pipeline, i.e., the load/store pipeline 650 or 651.

The execution of a vector load instruction starts from a reading operation from the main storage unit (MSU) 61. The load/store pipeline 650 or 651 must carry out an address calculation, and an address transformation, wait for an allowance of an access to the main storage unit (MSU) 61 by the memory control unit (MCU) 62, and then access the main storage unit (MSU) 61 to read out data from the main storage unit (MSU) 61.

However, in execution of a vector load instruction, the time necessary to read out data from the main storage unit (MSU) 61, in particular, the time necessary to obtain an allowance to access the main storage unit (MSU) 61 in the reading stage, is uncertain because the main storage unit (MSU) 61 may be in contention with the other data processing units.

Therefore, in the prior art, the timing of writing data in banks of the set of vector registers (VR) 652, is not determined when a vector load instruction is received, and the timing is determined just before (a few or several cycles before) the timing of the writing operation in the set of vector registers (VR) 652. Thus, the assignment of bank slot K or L is carried out just before the writing operation.

In the example shown in FIG. 7, the determination (assignment) of the bank slot for an vector load instruction, is carried out five cycles (5 τ) before the start of the writing operation in the set of vector registers (VR) 652 after a time T, which is uncertain as to when the vector load instruction is received, has elapsed after receiving the vector load instruction.

As explained before with reference to FIG. 5, when a non-composite calculation instruction is received, one of the two sets of the successive three bank slots (E3, E2, and E1), or (F3, F2, and F1), can be assigned for the instruction among the eight bank slots K, E3, E2, E1, L, F3, F2, and F1. However, when a composite calculation instruction, such as an addition-multiplication instruction, which instructs an execution of a calculation (A(i)+B(i))×C(i)=D(i), (i=1–n), is received, four bank slots are necessary for an execution of the addition-multiplication instruction in the adder-multiplier pipeline 656: one bank slot is for reading an element of A(i) from a bank of the set of vector registers (VR) 652, another for reading B(i), another for reading C(i), and the other for writing the result D(i) in the set of vector registers (VR) 652.

As understood from the above explanation, more bank slots than the aforementioned three successive bank slots (E3, E2, and E1), or (F3, F2, and F1), must be assigned for a composite calculation instruction. When a composite calculation instruction which requires four bank slots is received, generally, one of the bank slot K or L is assigned together with the three successive bank slots (E3, E2, and E1), or (F3, F2, and F1), i.e., four successive bank slots (K, E3, E2, and E1), (E3, E2, and E1, L), (K, F3, F2, and F1), or (F3, F2, and F1, L), are assigned for a composite calculation instruction.

In addition, composite calculation instructions are often executed just after an execution of a vector load instruction for a corresponding element, i.e., just after the loading of a corresponding element of vector data used for a calculation in a corresponding composite calculation pipeline.

FIG. 8 shows a timing of a successive execution of a vector load instruction and an addition-multiplication instruction using the data loaded by the vector load instruction.

To start a composite calculation instruction just after an execution of a vector load instruction for a corresponding element, i.e., just after the loading of a corresponding element of vector data used for a calculation in a corresponding composite calculation pipeline, necessary bank slots must be assigned for the composite calculation instruction, or in other words, for a corresponding composite calculation pipeline.

Since four successive bank slots (K, E3, E2, and E1), (E3, E2, and E1, L), (K, F3, F2, and F1), or (F3, F2, and F1, L), must be assigned for a composite calculation instruction, such as an addition-multiplication instruction, it is necessary to know which of the bank slots K and L is available for the composite calculation instruction (pipeline), at an early stage. In other words, it is necessary to know which of the bank slots K and L is assigned for the preceding vector load instruction (pipeline), at an early stage.

However, as described before with reference to FIG. 7, in the prior art, the assignment of bank slot K or L for a vector load instruction is carried out just before the writing operation is carried out. Therefore, it is impossible to assign a bank slot for a following composite calculation instruction (pipeline) because it is uncertain which of the bank slots K and L is available.

Generally, in the prior art it is difficult to dynamically assign a bank slot for instructions following a vector load instruction due to the late assignment of a bank slot.

SUMMARY OF THE INVENTION

An object of the present invention is to provide a vector data processing apparatus wherein dynamical assignment of bank slots for instructions which have been successively received is possible, and therefore, total processing speed is increased.

Another object of the present invention is to provide a vector data processing apparatus wherein an assignment of bank slots for a composite calculation instruction which have been received following a vector load instruction, is carried out in an early stage, and therefore, a total data processing throughput is increased.

According to the first aspect of the present invention, there is provided a vector data processing apparatus, comprising: a set of vector registers having a plurality of banks each bank being simultaneously and independently accessible; a plurality of calculation pipelines each of which reads out data from one or more banks of the vector registers, carries out a calculation using the data, and writes a result of the calculation into one bank of the vector registers; one or more of memory access pipelines through each of which a data transfer operation is carried out between a main storage unit and the banks of the vector registers; and a vector control unit for controlling operations in the vector data processing apparatus; each of the plurality of calculation pipelines and the one or more memory access pipelines can access cyclically each of the plurality of banks of the vector registers when one or more of a predetermined number of time slots through each of which time slots the access is carried out, are assigned to an instruction using the pipeline. The above vector control unit comprising: a memory access instruction detecting unit for detecting a reception of a memory access instruction; a pipeline operation status flag unit for indicating operation status of each of the plurality of calculation pipelines and the one or more memory access pipelines; a bank slot status indicating unit for indicating whether or not each of the predetermined number of time slots has already been assigned to an instruction using one of the plurality of calculation pipelines and the memory access pipelines; a bank slot timing generating unit for generating timing for each of the predetermined number of time slots; and a memory access instruction bank slot assigning unit for assigning a time slot to an instruction using a memory access pipeline immediately when a memory access instruction is newly detected, if it is determined that the memory access pipeline is available based on the indication of the pipeline operation status flag unit, and that the time slot is available based on the indication of the bank slot status indicating unit.

According to the second aspect of the present invention, there is provided a vector data processing apparatus, comprising: a set of vector registers having a plurality of banks each of which banks is simultaneously and independently accessible; a plurality of calculation pipelines each of which reads out data from one or more banks of the vector registers, carries out a single or composite calculation using the data, and writes the result of the calculation into one bank of the vector registers; one or more of memory access pipelines through each of which a data transfer operation is carried out between a main storage unit and the banks of the vector registers; and a vector control unit for controlling operations in the vector data processing apparatus; each of the plurality of calculation pipelines and the one or more memory access pipelines can access cyclically each of the plurality of banks of the vector registers when one or more of a predetermined number of time slots, through each of which time slots the cyclical access is carried out, are assigned to an instruction using the pipeline. The above vector control unit comprising: a memory access instruction detecting unit for detecting a reception of an memory access instruction; a pipeline operation status flag unit for indicating operation status of each of the plurality of calculation pipelines and the one or more of memory access pipelines; a bank slot status indicating unit for indicating whether or not each of the predetermined number of time slots has already been assigned to an instruction using one of the plurality of calculation pipelines and the memory access pipelines; a bank slot timing generating unit for generating timing of the time slot; a memory access instruction bank slot assigning unit for assigning a time slot to a memory access pipeline immediately when a memory access instruction is newly detected in the memory access instruction detecting unit, if it is determined that the memory access pipeline is available based on the indication of the pipeline operation status flag unit, and that the time slot is available based on the indication of the bank slot status indicating unit; a composite calculation instruction detecting unit for detecting a reception of a composite calculation instruction which instructs the use of one of the plurality of calculation pipelines wherein the composite calculation is carried out; and a composite calculation instruction bank slot assigning unit for assigning one or more time slots to an instruction using a composite calculation pipeline when the composite calculation instruction is newly detected in the composite calculation instruction detecting unit, if it is determined that the composite calculation pipeline is available based on the indication of the pipeline operation status flag unit, and that the time slots are available based on the indication of the bank slot status indicating unit.

BRIEF DESCRIPTION OF THE DRAWINGS

In the drawings:

FIG. 2 is a chart illustrating a detailed construction of the set of vector registers (VR) 652 and the set of mask registers (MR) 658;

FIG. 5 is a diagram illustrating an example of the access timing and the read/write data by a non-composite calculation pipeline for which the bank slots E3, E2, and E1 are assigned;

FIG. 15 is a chart illustrating an example of assignment of a bank slot for a vector load instruction for the two types of models of the vector data processing apparatus, and the timing of the bank slots;

FIG. 19 is a diagram of a type "MA0" of a four successive bank slots E3, E2, E1, and L;

FIG. 20 is a diagram of a type "MA1" of a four successive bank slots F3, F2, F1, and K;

FIG. 21 is a diagram of the correspondence between the denotations of the addresses "R1", "R2M", "R2A", and "R3", and the vector data B, C, and D, used for the composite calculation, and the calculation result A;

FIG. 22 is a circuit diagram of a construction for obtaining a start control signal SET-START-MA0-M&A-OP for releasing an execution of a composite calculation instruction using the pipeline E with the four successive bank slots (E3, E2, E1, and L);

FIG. 23 is a circuit diagram of a construction for generating and holding a general start control signal START-MA0 for releasing execution of a composite calculation instruction, a non-composite addition, and a non-composite multiplication using the pipeline E;

FIG. 24 is a circuit diagram of a construction for obtaining a start control signal SET-START-MA1-M&A-OP for releasing an execution of a composite calculation instruction using the pipeline F with the four successive bank slots (F3, F2, F1, and K);

FIG. 25 is a circuit diagram of a construction for generating and holding a general start control signal START-MA1 for releasing execution of a composite calculation instruction, a non-composite addition, and a non-composite multiplication using the pipeline F;

FIG. 30 is a chart illustrating a timing when a composite calculation instruction is executed in the composite calculation pipeline E.

DESCRIPTION OF THE PREFERRED EMBODIMENTS

Before describing the preferred embodiment of the present invention, first, the basic principle of the first and second aspects of the present invention is explained below.

Figure 1:
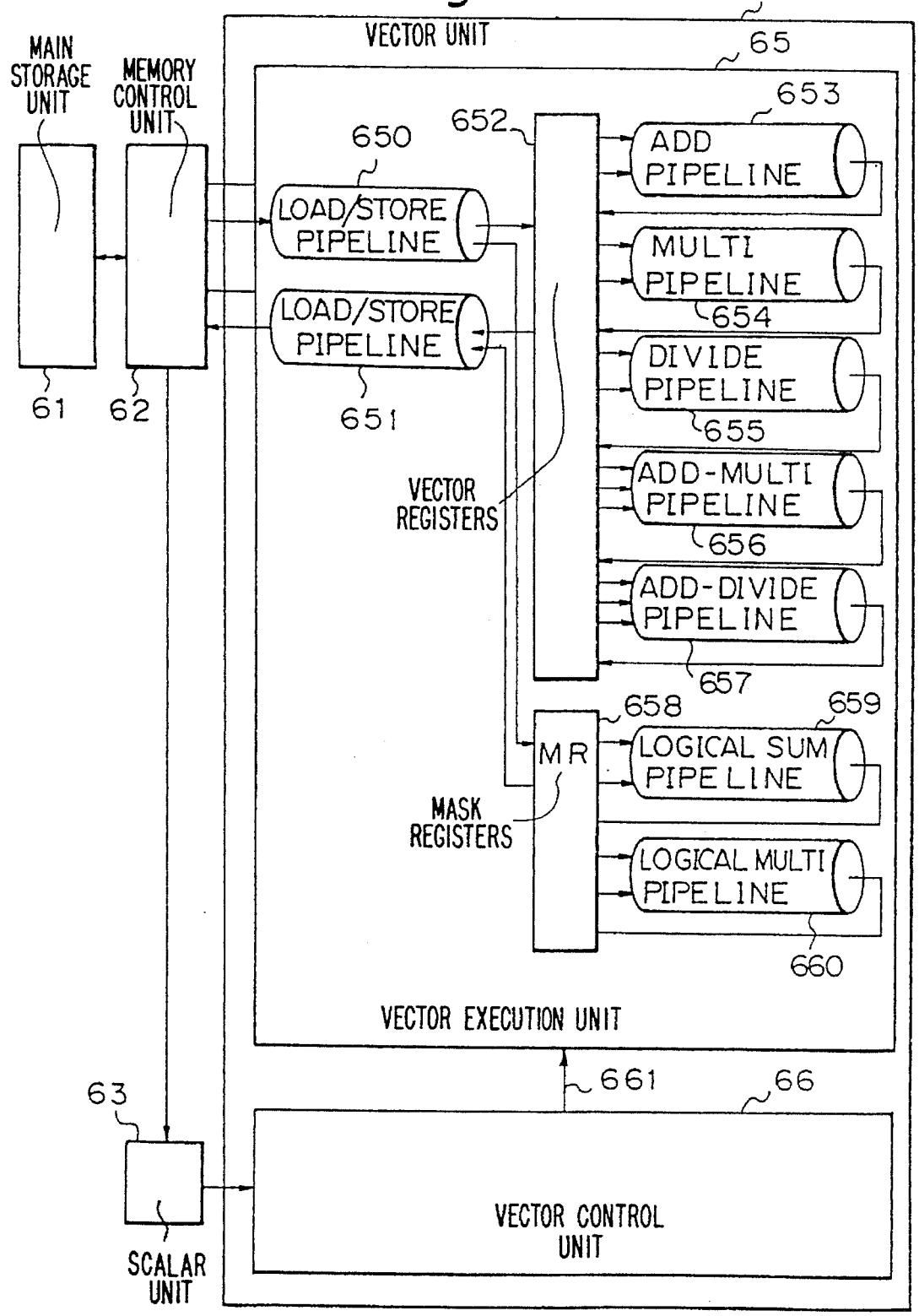
FIG. 1 is a block diagram of the construction of an example of data processing apparatus comprising a vector data processing apparatus.
Figure 3:
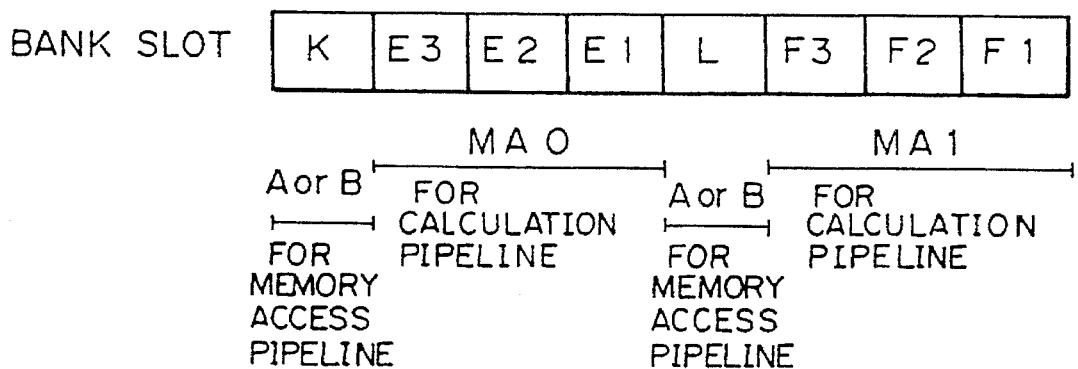
FIG. 3 is a diagram of eight bank slots, K, E3, E2, E1, L, F3, F2, and F1, and eight banks, B0, B1,–B7 of the set of vector registers (VR) 652.

The first aspect of the present invention is applicable to a vector data processing apparatus, comprising a set of vector registers 652, a plurality of calculation pipelines 653–660, one or more of memory access pipelines 650, 651, and a vector unit control unit 66. The vector data processing apparatus shown in FIG. 1, is an example of the above.

In the above vector data processing apparatus, the set of vector registers 652 each have a plurality of banks B0, B1,–B7, and each of the banks is simultaneously and independently accessible.

Each of the plurality of calculation pipelines 653–660 reads out data from one or more banks of the vector registers 652, carries out a calculation using the data, and writes a result of the calculation into one bank of the vector registers 652.

A data transfer operation between a main storage unit 61 and one bank of the vector registers 652, is carried out through each of the memory access pipelines 650, 651.

The vector control unit 66 controls operations in the vector data processing apparatus.

Each of the plurality of calculation pipelines 653–660 and the memory access pipelines 650, 651 can cyclically access each of the plurality of banks of the vector registers 652 when one or more of a predetermined number of time slots are assigned to the pipeline, through which time slot the cyclical access is carried out.

The characteristic features of the first aspect of the present invention exist in the above vector control unit 66.

Figure 9:
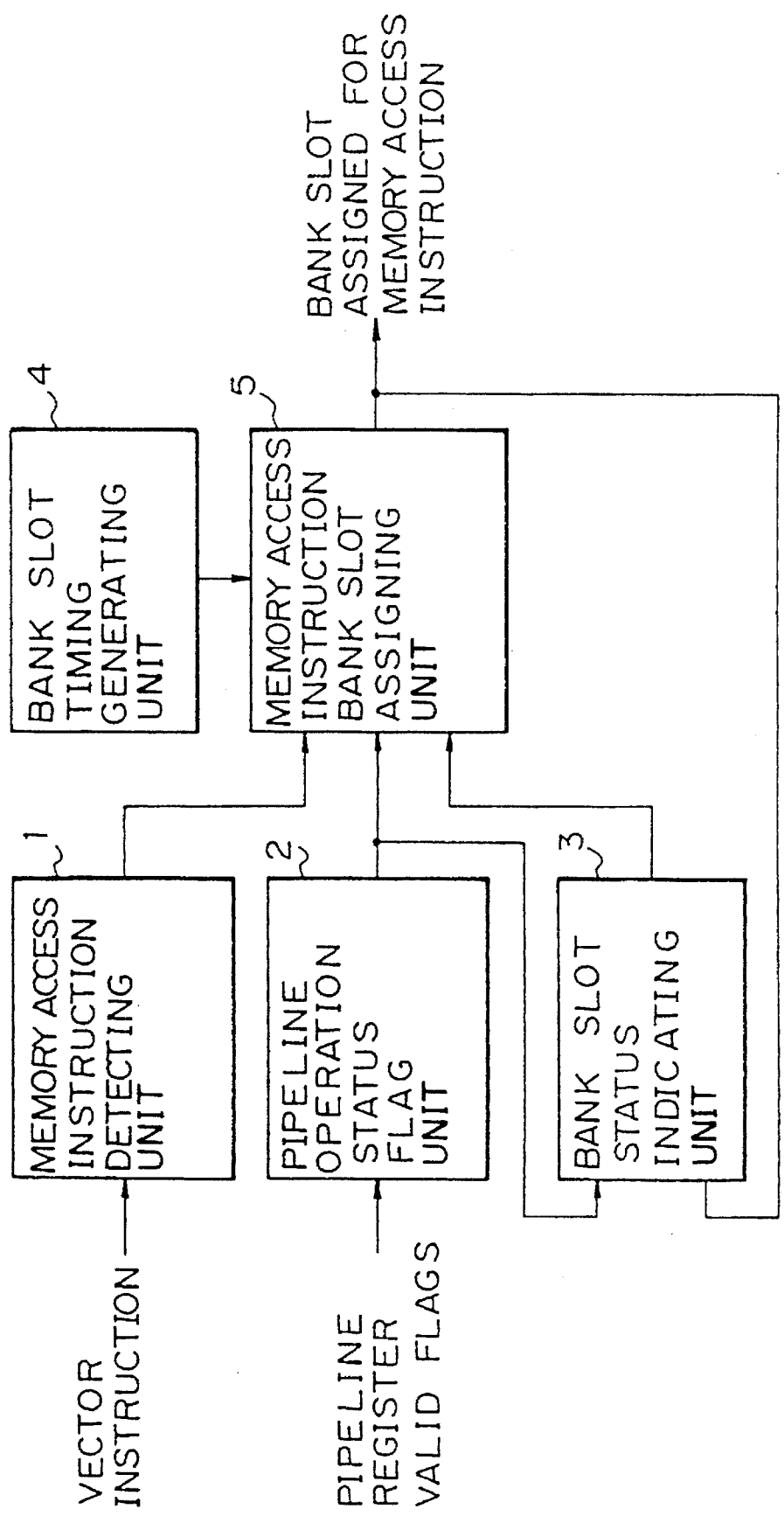
FIG. 9 is a block diagram of the characteristic portion in the basic construction of the first aspect of the present invention.

FIG. 9 shows the characteristic portion in the basic construction of the first aspect of the present invention.

In FIG. 9, reference numeral 1 denotes a memory access instruction detecting unit, 2 denotes a pipeline operation status flag unit, 3 denotes a bank slot status indicating unit, 4 denotes a bank slot timing generating unit, and 5 denotes a memory access instruction bank slot assigning unit.

The memory access instruction detecting unit 1 detects a reception of a memory access instruction.

The pipeline operation status flag unit 2 indicates operation status of each of the plurality of calculation pipelines 653–660 and the one or more of memory access pipelines 650, 651.

The bank slot status indicating unit 3 (or time slot status indicating means) indicates whether or not each of the predetermined number of time slots have already been assigned to one of the plurality of calculation pipelines 653–660 and the one or more of memory access pipelines 650, 651.

The bank slot timing generating unit 4 or time slot timing generating means generates timing for each of the predetermined number of time slots.

The memory access instruction bank slot assigning unit 5 or instruction time slot assigning means assigns a time slot to a memory access pipeline, if the memory access pipeline is determined to be available based on an indication from the pipeline operation status flag unit 2, and the time slot is determined to be available based on an indication from the bank slot status indicating unit 3, immediately when a memory access instruction is newly detected.

According to the first aspect of the present invention, when a memory access instruction is newly received, it is detected by the memory access instruction detecting unit 1, and immediately after the detection, the memory access instruction bank slot assigning means 5 collects: information about an available memory access pipeline for executing the received memory access instruction, from the output of the pipeline operation status flag unit 2; information about an available bank slot, from the output of the bank slot status indicating unit 3; and timing information for the bank slot from the output of the bank slot timing generating unit 4; and then carries out an assignment of a bank slot for the above received memory access instruction. Thus, an assignment of a bank slot for the above received memory access instruction, is carried out immediately after the reception of the instruction.

Therefore, according to the present invention, when an instruction following the above memory access instruction, is newly received, it is clear which time slot is available for the newly-received instruction in an early stage.

Further, generally, the early assignment of a bank slot according to the present invention, enables a dynamic assignment of time (bank) slots for instructions following a vector load instruction, and this improves a total data processing throughput.

Similar to the above-mentioned first aspect of the present invention, the second aspect of the present invention is also applicable to a vector data processing apparatus, comprising a set of vector registers 652, a plurality of calculation pipelines 653–660, one or more memory access pipelines 650, 651, and a vector control unit 66. The vector data processing apparatus shown in FIG. 1, is an example of the above.

In particular, in the second aspect of the present invention, each of the plurality of calculation pipelines 653–660 reads out data from one or more banks of the vector registers 652, carries out a composite or non-composite calculation using the data, and writes a result of the calculation into one bank of the vector registers 652.

The characteristic features of the second aspect of the present invention also exist in the above vector control unit 66.

Figure 10:
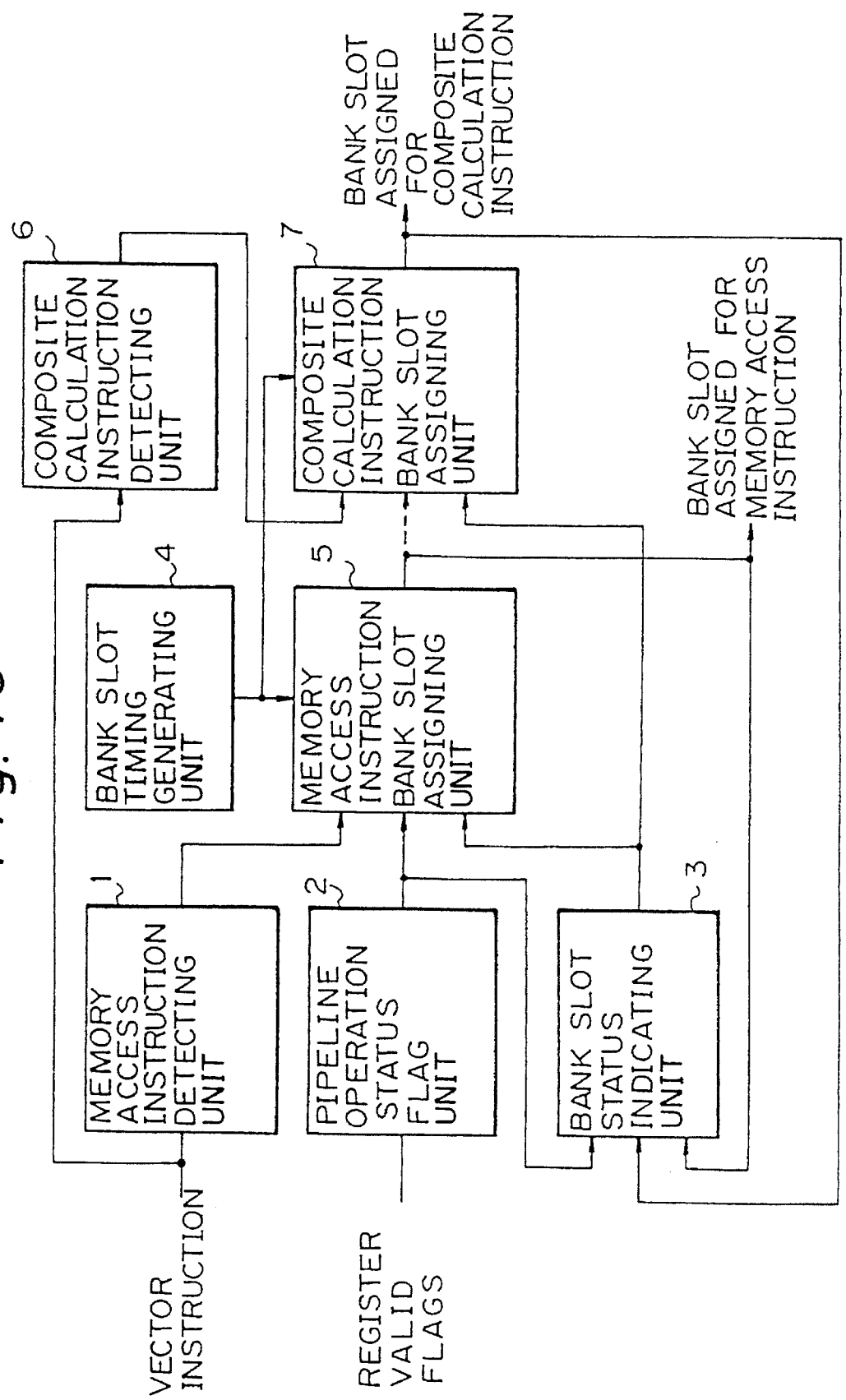
FIG. 10 is a block diagram of the characteristic portion in the construction of the second aspect of the present invention.

FIG. 10 shows the characteristic portion in the basic construction of the second aspect of the present invention.

In FIG. 10, reference numeral 1 denotes a memory access instruction detecting unit, 2 denotes a pipeline operation status flag unit, 3 denotes a bank slot status indicating unit, 4 denotes a bank slot timing generating unit, 5 denotes a memory access instruction bank slot assigning unit, 6 denotes a composite calculation instruction detecting unit, and 7 denotes a composite calculation instruction bank slot assigning unit.

Namely, the vector data processing apparatus according to the second aspect of the present invention comprises the composite calculation instruction detecting unit 6, and the composite calculation instruction bank slot assigning unit 7, in addition to the construction of the first aspect of the present invention.

The composite calculation instruction detecting unit 6 detects a reception of a composite calculation instruction which instructs use of one of the plurality of calculation pipelines 656, 657 to execute the composite calculation instruction.

The composite calculation instruction bank slot assigning unit 7 assigns one or more time slots to a composite calculation instruction using a composite calculation pipeline when the composite calculation instruction is newly detected in the composite calculation instruction detecting unit 6, if it is determined that the composite calculation pipeline is available based on the indication of the pipeline operation status flag unit 2, and that the one or more time slots are available based on the indication of the bank slot status indicating unit 3.

Similar to the above-mentioned first aspect of the present invention, according to the second aspect of the present invention, when a memory access instruction is newly received, it is detected by the memory access instruction detecting unit 1, and immediately after the detection, the memory access instruction bank slot assigning unit 5 collects: information about an available memory access pipeline for executing the received memory access instruction, from the output of the pipeline operation status flag unit 2; information about an available bank slot, from the output of the bank slot status indicating unit 3; and timing information for the bank slot from the output of the bank slot timing generating unit 4; and then carries out an assignment of a bank slot for the above received memory access instruction. Thus, an assignment of a bank slot for the above received memory access instruction, is carried out immediately after the reception of the instruction.

Further, in the second aspect of the present invention, when a composite calculation instruction is newly received, it is detected by the composite calculation instruction detecting unit 6, and immediately after the detection, the composite calculation instruction bank slot assigning unit 7 collects: information about an available composite calculation pipeline for executing the received composite calculation instruction, from the output of the pipeline operation status flag unit 2; information about an available bank slot, from the output of the bank slot status indicating unit 3; and timing information for the bank slot from the output of the bank slot timing generating unit 4; and then carries out an assignment of a bank slot for the above received composite calculation instruction. Thus, an assignment of a bank slot for the above received composite calculation instruction, is carried out immediately after the reception of the instruction.

Since the assignment of a time slot for accessing the set of vector registers (VR) 652 is carried out immediately after the reception of the memory access instruction according to the second aspect of the present invention, when a composite calculation instruction following the above memory access instruction, is newly received, it is clear which time slot is available for the newly-received composite calculation instruction in an early stage.

Therefore, the composite calculation instruction bank slot assigning unit 7 can assign a time (bank) slot for the newly-assigned composite calculation instruction immediately when the composite calculation instruction is received, based on the status of assignment of time (bank) slots, wherein the result of the assignment of a bank slot for the preceding memory access instruction is already included owing to the early assignment for the memory access instruction.

Thus, according to the second aspect of the present invention, an early assignment of time (bank) slot for a composite calculation instruction following a memory access instruction is possible, and a total data processing throughput is improved.

Hereinafter, a detailed construction of an embodiment of the present invention is explained.

Figure 11:
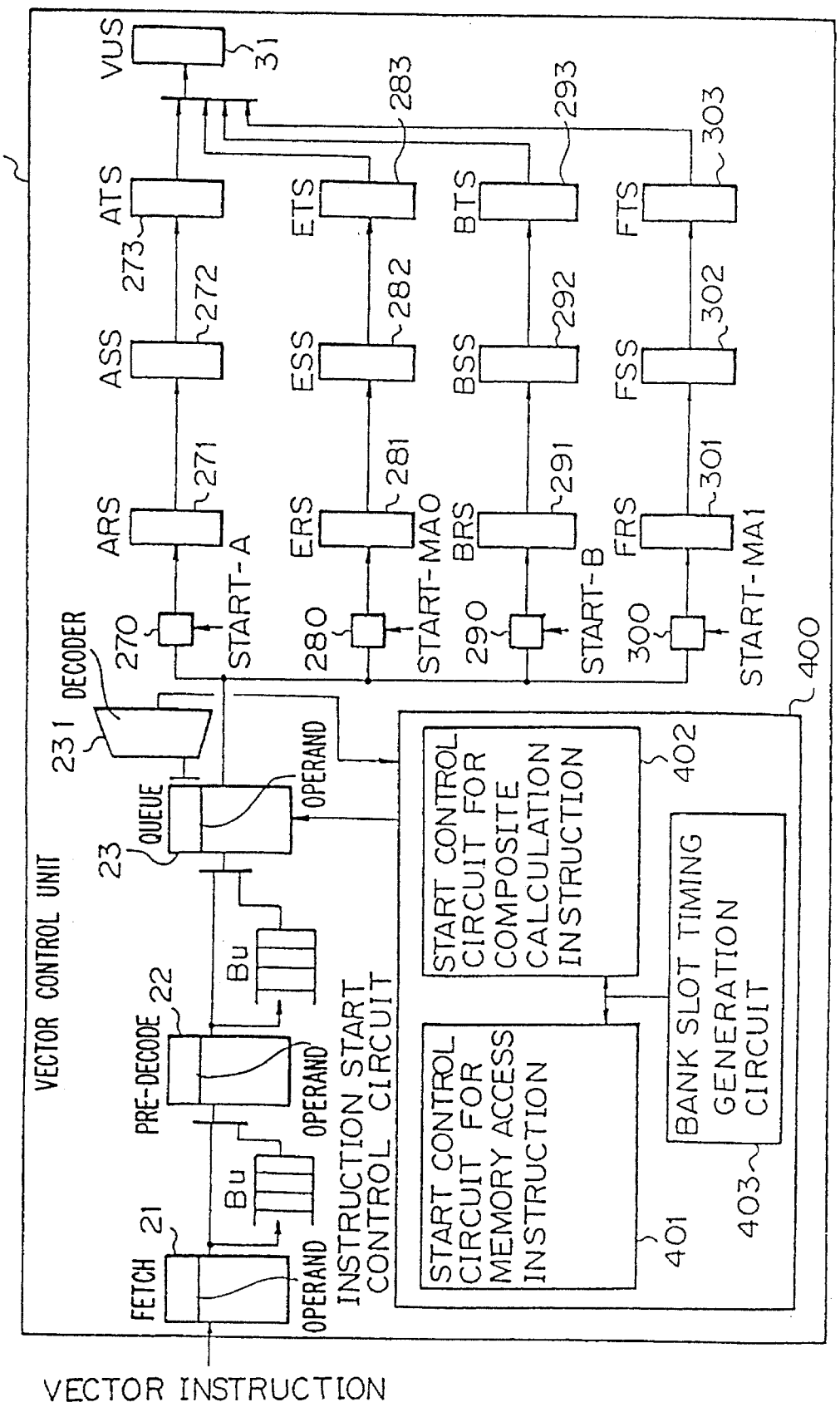
FIG. 11 is a block diagram of a portion pertaining to the present invention of the vector control unit (VCU) 66 in an embodiment of the present invention.

FIG. 11 shows an outline of a portion of the vector control unit (VCU) 66 pertaining to the present invention in an embodiment of the present invention.

In FIG. 11, reference numeral 21 denotes a vector instruction register (F) in the fetch stage, 22 denotes a vector instruction register (P) in the pre-decoded stage, 23 denotes a vector instruction register (Q) in the vector instruction start queue stage, 231 denotes an instruction decoder, 270, 280, 290, and 300 each denote a gate, 271 denotes a vector instruction register (ARS) in the pipeline read stage for the load/store (memory access) pipeline A, 272 denotes a vector instruction register (ASS) in the pipeline startup stage for the load/store pipeline A, 273 denotes a vector instruction register (ATS) in the pipeline terminate stage for the load/store pipeline A, 281 denotes a vector instruction register (ERS) in the pipeline read stage for the calculation pipeline E, 282 denotes a vector instruction register (ESS) in the pipeline startup stage for the calculation pipeline E, 283 denotes a vector instruction register (ETS) in the pipeline terminate stage for the calculation pipeline E, 291 denotes a vector instruction register (BRS) in the pipeline read stage for the load/store pipeline B, 292 denotes a vector instruction register (BSS) in the pipeline startup stage for the load/store pipeline B, 293 denotes a vector instruction register (BTS) in the pipeline terminate stage for the load/store pipeline B, 301 denotes a vector instruction register (FRS) in the pipeline read stage for the calculation pipeline F, 302 denotes a vector instruction register (FSS) in the pipeline startup stage for the calculation pipeline F, 303 denotes a vector instruction register (FTS) in the pipeline terminate stage for the calculation pipeline F, 400 denotes a pipeline instruction start control circuit, 401 denotes a start control circuit for memory access instruction, 402 denotes a start control circuit for composite calculation instruction, and 403 denotes a bank slot timing generation circuit.

The above-mentioned pipelines A and B are each, for example, one of the load/store pipelines 650 and 651 in FIG. 1, and the above pipelines E and F are each a composite calculation pipeline, for example, one of the adder-multiplier pipeline 656 and the adder-divider pipeline 657 in FIG. 1.

When a vector instruction is sent from the aforementioned scaler unit (SU) 63 in FIG. 1 to the vector control unit (VCU) 66, it is first held in the vector instruction register (F) 21 in the fetch stage, and then is sent to the vector instruction register (P) 22 in the pre-decode stage, where the vector instruction is pre-decoded, e.g., validity of the instruction is checked, and an exception state is detected.

Next, the vector instruction is loaded in the vector instruction register (Q) 23 in the vector instruction start queue stage, where the vector instruction is decoded by the instruction decoder 231, and then the decoded result is input into the instruction start control circuit 400.

The instruction start control circuit 400 carries out a start control operation of a newly-received vector instruction, i.e., determines a pipeline to execute the vector instruction based on the status of the entire vector unit (VU) 64, assigns a bank slot for the instruction (the above determined pipeline) based on the status of assignment of bank slots, and releases the vector instruction from the queue stage (from the vector instruction register (Q) 23 in the vector instruction start queue stage).

If, for example, it is determined that the pipeline A is to be used for execution of the instruction, the gate 270 is opened as explained later, and the instruction is loaded in the vector instruction register (ARS) 271 in the pipeline read stage for the load/store (memory access) pipeline A. In the read stage, the pipeline A carries out the operation of reading data, for example, from the main storage unit (MSU) 61 when the instruction is a vector load instruction. As mentioned before, in the reading stage, the pipeline A carries out an address calculation, and an address transformation, waits for an allowance of an access to the main storage unit (MSU) 61, accesses the main storage unit (MSU) 61, and then receives data.

When the reading is completed, the instruction loaded in the register 271 is input into the vector instruction register (ASS) 272 in the pipeline startup stage for the load/store pipeline A.

While the operation in the pipeline A is carried out (in the startup stage), the instruction is held in the register 272. When, the operation in the pipeline A is completed, the instruction is input into the vector instruction register (ATS) 273 in the pipeline terminate stage for the load/store pipeline A. In the pipeline terminate stage, the result of the above operation in the pipeline is written in the set of vector registers (VR) 652.

Similar to the above, when it is determined a pipeline is to be used for a newly-received instruction, a corresponding gate 270, 280, 290, or 300 is opened, and then the instruction is held in the register 271, 281, 291, or 301 in the read stage, is held in the register 272, 282, 292, or 302 in the startup stage, and is held in the register 273, 283, 293, or 303 in the pipeline terminate stage, respectively.

Figure 4:
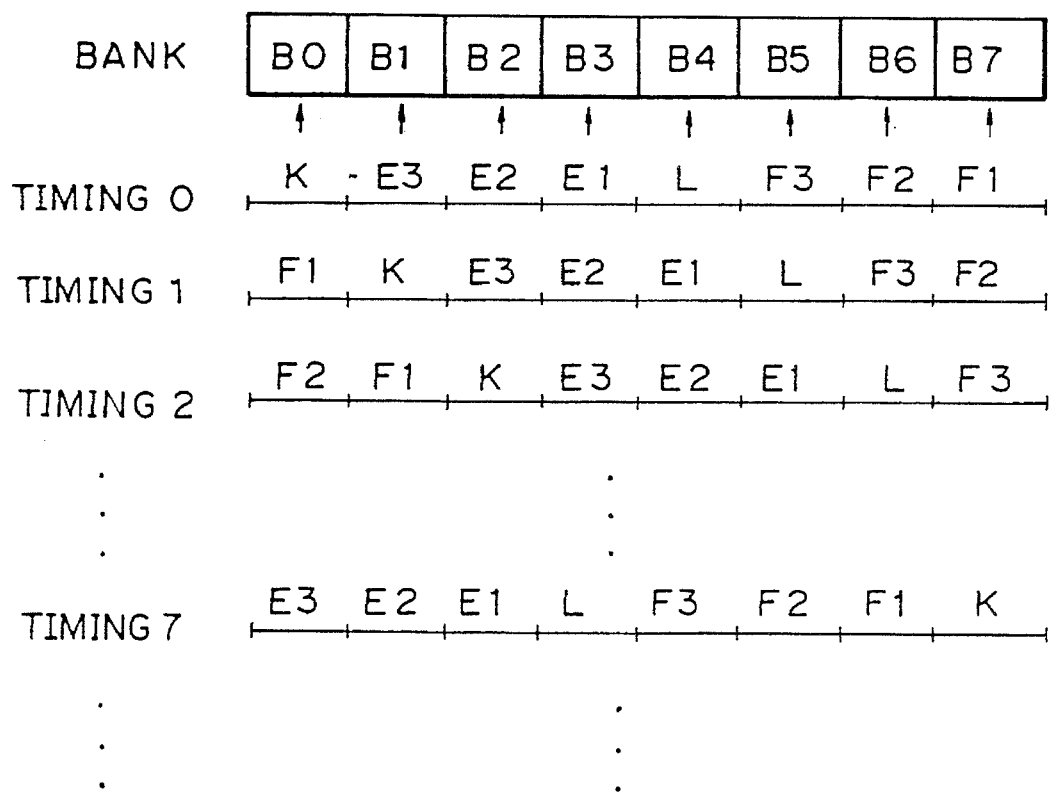
FIG. 4 is a timing diagram of cyclical accesses to the banks of the set of vector registers (VR) 652 through bank slots K, E3, E2, E1, L, F3, F2, and F1.
Figure 6:
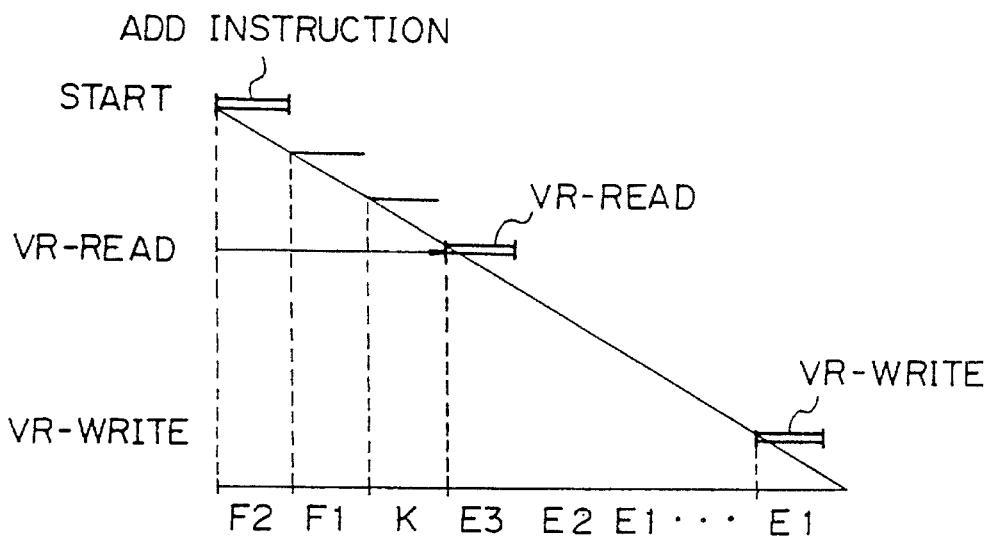
FIG. 6 is a chart illustrating an example of a timing of bank slot assignment when a calculation instruction is received.
Figure 7:
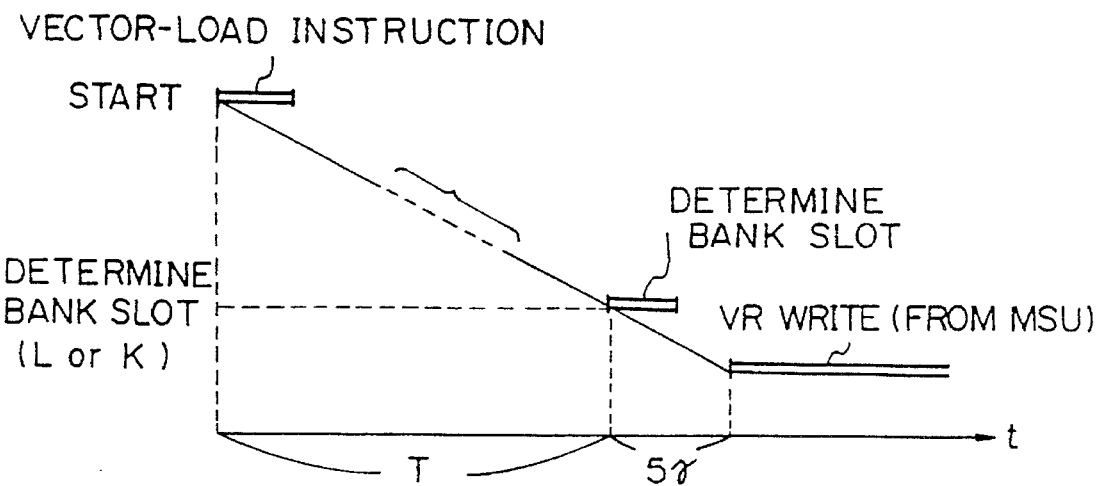
FIG. 7 is a chart illustrating an example of a timing of bank slot assignment when a vector load instruction is received.
Figure 8:
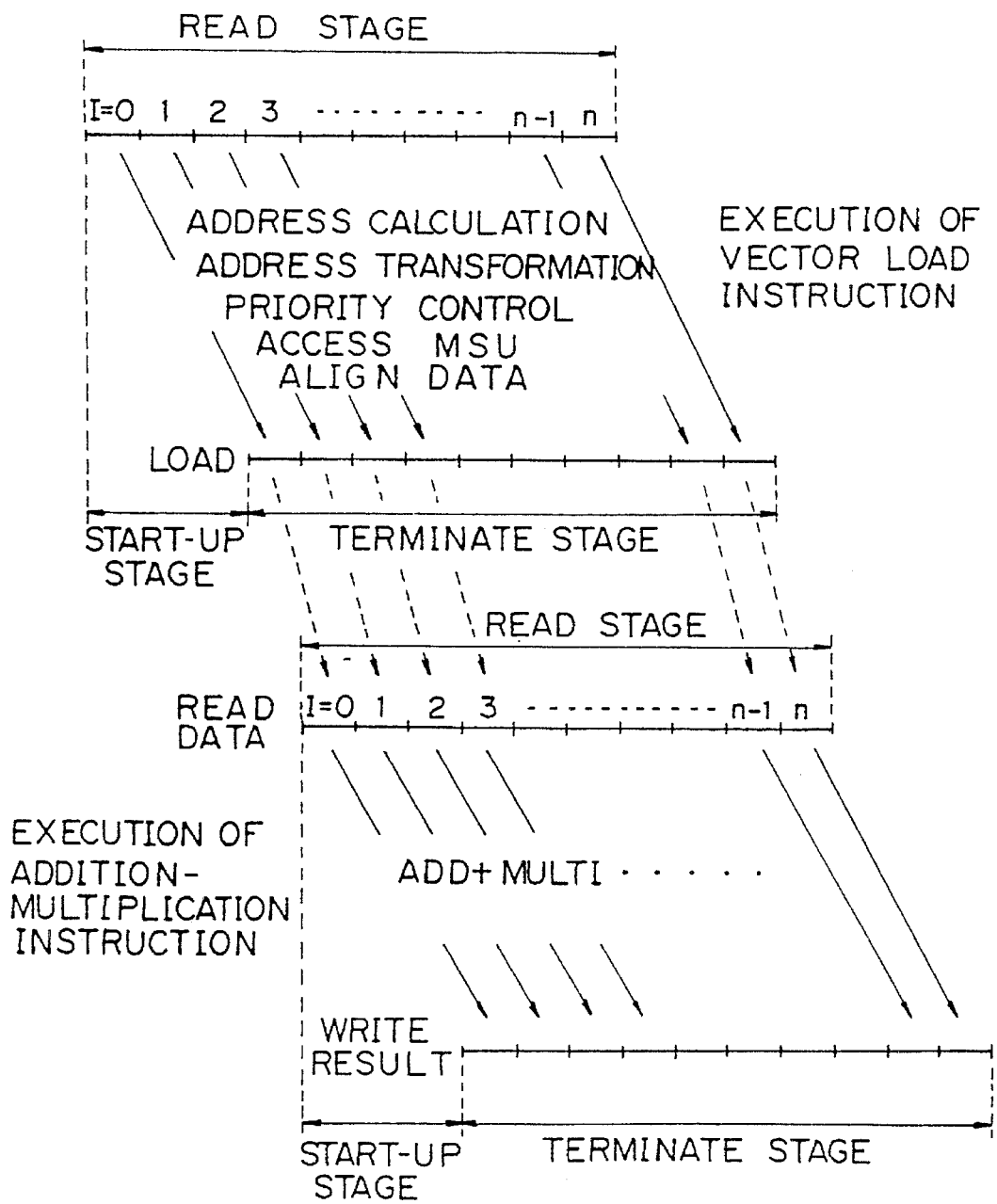
FIG. 8 is a chart illustrating a timing of a successive execution of a vector load instruction and an addition-multiplication instruction using the data loaded by the vector load instruction.

The above control operation is carried out for each type of vector instruction. The memory access instruction start control circuit 401, and the composite calculation instruction start control circuit 402, shown in the instruction start control circuit 400 of FIG. 11, are constructions for carrying out the above control operations for memory access instructions and composite calculation instructions. The bank slot timing generating circuit 403 shown in the instruction start control circuit 400 of FIG. 11 generates a timing corresponding to the bank slots shown in FIG. 4. The timing can be obtained as an output of a counter (not shown).

The memory access instruction start control circuit 401 operates when the output of the instruction decoder 231 indicates a detection of a memory access instruction.

The memory access instruction start control circuit 401 determines a memory access (load/store) pipeline to execute the memory access instruction based on the status of the load/store pipelines 650 and 651 in the vector unit (VU) 64 of FIG. 1, assigns a bank slot for the instruction (the above determined pipeline) based on the status of assignment of bank slots, and releases the memory access instruction from the queue stage (from the vector instruction register (Q) 23 in the vector instruction start queue stage).

The composite calculation instruction start control circuit 402 determines a composite calculation pipeline to execute the composite calculation instruction based on the type of the composite calculation instruction, assigns a bank slot for the instruction (the above determined pipeline) based on the status of assignment of bank slots, and releases the composite calculation instruction from the queue stage (from the vector instruction register (Q) 23 in the vector instruction start queue stage).

The releasing operation is carried out by opening one of the gates 270 to 300 according to a pipeline which is determined to be used for the instruction.

The determination of the memory access pipeline used for the memory access instruction is made by a memory access instruction start condition circuit 404.

Figure 12:
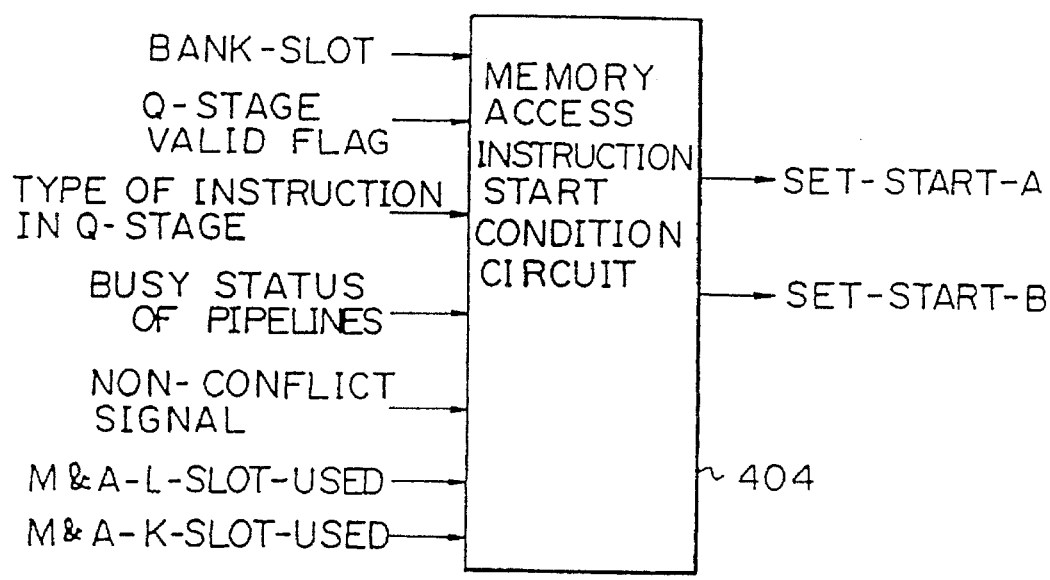
FIG. 12 is a diagram illustrating the input-output relationship of the memory access instruction start condition circuit 404, which determines a pipeline to be used for the memory access instruction loaded in the vector instruction register (Q) 23 in the vector instruction start queue stage.

FIG. 12 shows the input-output relationship of the memory access instruction start condition circuit 404, which determines a pipeline to be used for the memory access instruction loaded in the vector instruction register (Q) 23 in the vector instruction start queue stage.

The inputs of the memory access instruction start condition circuit 404 are: the timing information for bank slots obtained from the bank slot timing generating circuit 403; a Q-stage valid flag which indicates that a valid instruction is loaded in the vector instruction register (Q) 23 in the vector instruction start queue stage; the type of the vector instruction register (Q) 23, a vector load instruction or a vector store instruction, i.e., the output of the instruction decoder 231; the status of the pipelines in the vector unit (VU) 64, which indicates which pipeline is available; two input signals M&A-SLOT-L-USED or M&A-SLOT-K-USED indicating whether or not the bank slots K and L is being used by composite calculation pipelines, which are explained later; and a signal indicating a conflict status in the addresses in the set of vector registers (VR) 652.

The memory access instruction start condition circuit 404 has two outputs, a SET-START-A signal, and a SET-START-B signal.

When the aforementioned pipeline A is determined to be used for executing the memory access instruction, the SET-START-A signal becomes active, and when the aforementioned pipeline B is determined to be used for executing the memory access instruction, the SET-START-B signal becomes active.

The non-conflict signal is obtained from a non-conflict condition circuit 405. The input-output relationship of the non-conflict condition circuit 405 is shown in FIG. 13.

Figure 13:
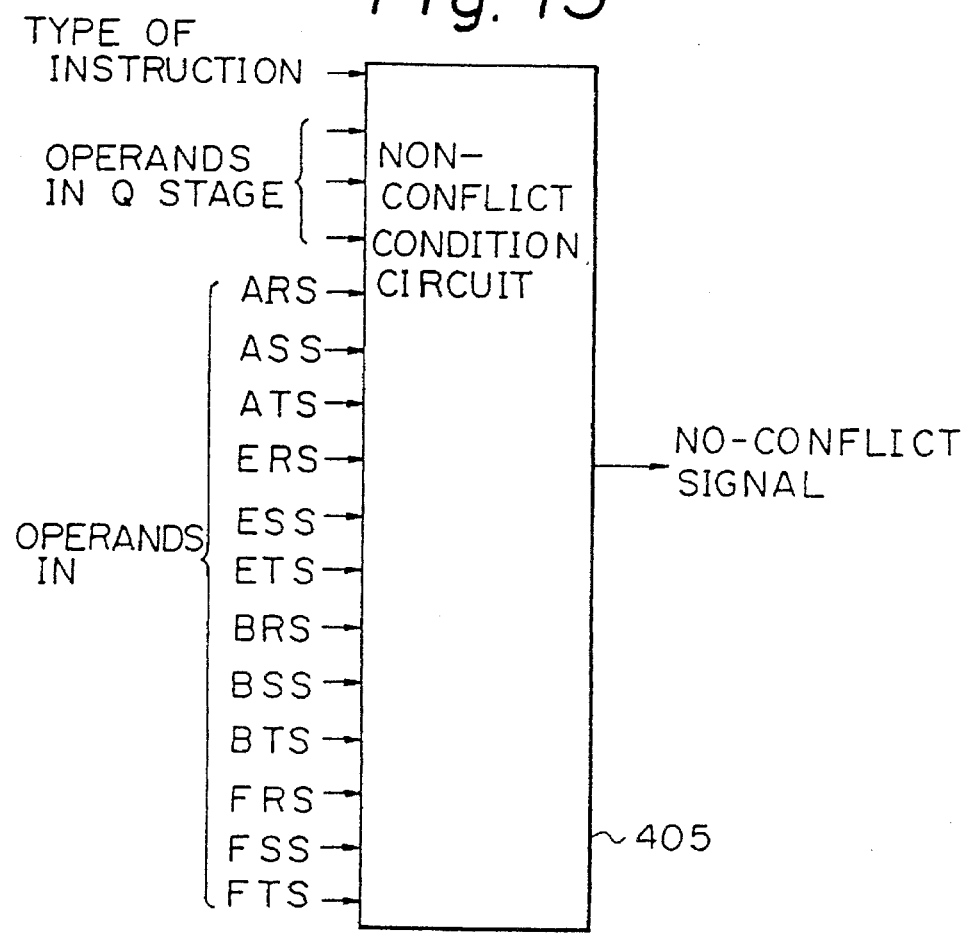
FIG. 13 is a diagram illustrating the input-output relationship of the non-conflict condition circuit 405.

The inputs of the non-conflict condition circuit 405 in FIG. 13 are: the type of the instruction, i.e., the output of the instruction decoder 231; the operands of the instruction in the Q-stage, i.e. in the vector instruction register (Q) 23 in the vector instruction start queue stage; and the operands in the instructions loaded in all vector instruction registers in the read stage, in the startup stage, and in the pipeline terminate stage of all pipelines in the vector unit (VU) 64, such as the vector instruction registers 271 to 273, 281 to 283, 291 to 293, and 301 to 303 shown in FIG. 11.

The non-conflict condition circuit 405 determines whether or not a conflict will occur between all operations carrying out the pipelines in the vector unit (VU) 64 and the operation by the newly-received (loaded in the Q-stage) instruction regarding use of the addresses of the set of vector registers (VR) 652, and outputs the above non-conflict signal when it is determined that no conflict exists.

Both the memory access instruction start condition circuit 404 in FIG. 12 and the non-conflict condition circuit 405 in FIG. 13 are realized by a hardware logic circuit.

Figure 14:
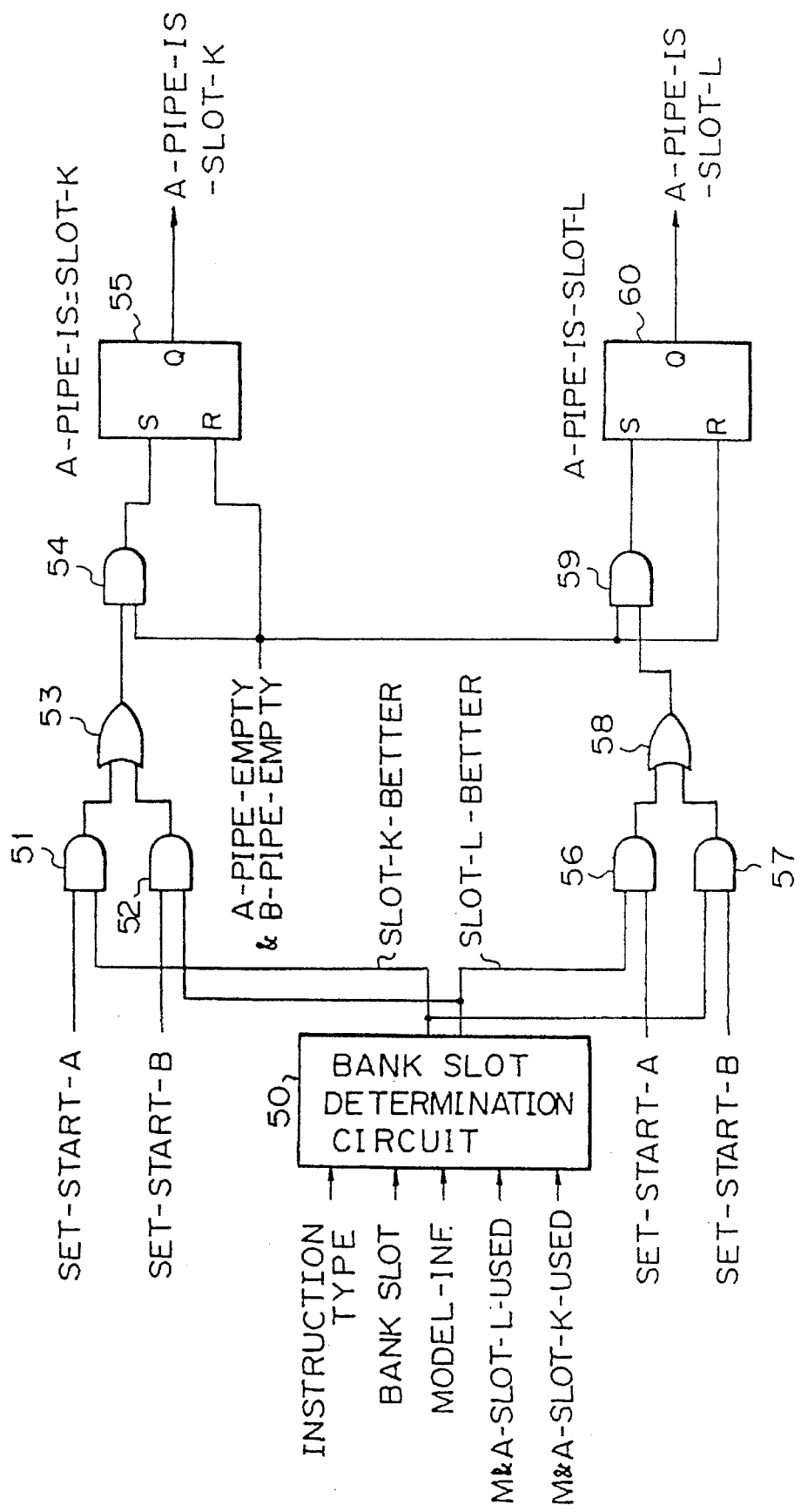
FIG. 14 is a circuit diagram of the construction of a circuit for assigning a bank slot for an instruction and for a pipeline in the embodiment of the present invention.

Next, the assignment of a bank slot for the newly-received (loaded in the Q-stage) instruction is carried out by the circuit shown in FIG. 14.

In FIG. 14, reference numeral 50 denotes a bank slot determination circuit, or instruction time slot assigning means 51, 52, 54, 56, 57, and 59 each denote an AND gate, 53 and 58 each denotes an OR gate, and 55 and 60 each denotes an SR-type flip-flop circuit.

The bank slot determination circuit 50 inputs the instruction type, the timing information of the bank slots obtained from the bank slot timing generating circuit 403, model information of the vector data processing apparatus, and the above-mentioned two input signals M&A-SLOT-L-USED or M&A-SLOT-K-USED indicating whether or not the bank slots K and L are being used by composite calculation pipelines, and then assigns a bank slot for the newly-received (loaded in the Q-stage) instruction based on the above inputs.

The model information indicates a specific type of vector data processing apparatus, which type influences on the assignment of the bank slot, for to achieve a minimum necessary time to complete the setting of data to access the set of vector registers (VR) 652 when a vector load instruction is received. This minimum necessary time is 25 τ in one model I, and 27 τ in another model II.

FIG. 15 shows an example of assignment of a bank slot for a vector load instruction for the above two types of models of the vector data processing apparatus, and the timing of the bank slots.

In FIG. 15, the F1,–F3,–E1,–E3, - - - show the timing information by indicating the bank slot accessible to the bank B0 of the set of vector registers (VR) 652 in each timing.

Depending on the above inputs, the bank slot K or L is assigned for the vector load instruction, which is executed by the load/store pipeline after accessing main storage unit 61, and a minimum necessary time for which accessing depends upon the model information, as indicated above.

The above assignment result of the bank slots K or L is output as a SLOT-K-BETTER signal or a SLOT-L-BETTER signal, respectively. The SLOT-K-BETTER signal is applied to one input terminal of each of the AND gates 51 and 57, and the SLOT-L-BETTER signal is applied to one input terminal of each of the AND gates 52 and 56 in FIG. 14.

The AND gates 51 and 56 each receive the aforementioned SET-START-A signal from the memory access instruction start condition circuit 404 in FIG. 12 at the other input terminal, respectively, and the AND gates 52 and 57 each receive the aforementioned SET-START-B signal from the memory access instruction start condition circuit 404 in FIG. 12 at the other input terminal, respectively.

The outputs of the AND gates 51 and 52 are applied to both input terminals of the OR gate 53, and the outputs of the AND gates 56 and 57 are applied to both input terminals of the OR gate 58.

The output of the OR gate 53 is applied to one input terminal of the AND gate 54, and the output of the OR gate 58 is applied to one input terminal of the AND gate 59. The AND gates 54 and 59 each receive a signal indicating that both the pipeline A (the load/store pipeline 650) and the pipeline B (the load/store pipeline 651) are not used, A-PIPE-EMPTY & B-PIPE-EMPTY, at its other input terminal, respectively.

The output of the AND gate 54 is applied to a set input terminal S of the SR-type flip-flop circuit 55, and the output of the AND gate 59 is applied to a set input terminal of the SR-type flip-flop circuit 60. The SR-type flip-flop circuits 55 and 60 each receive the above A-PIPE-EMPTY & B-PIPE-EMPTY signal at its own reset input terminal R, respectively.

When the Q output A-PIPE-IS-SLOT-K of the SR-type flip-flop circuit 55 is active, this indicates that a bank slot K is assigned for the pipeline A, or that a bank slot L is assigned for pipeline B; and when the Q output A-PIPE-IS-SLOT-L of the SR-type flip-flop circuit 55 is active, this indicates that a bank slot L is assigned for the pipeline B, or that a bank slot K is assigned for the pipeline A.

Although not shown, an active gate control signal START-A shown in FIG. 11 is generated by the memory access instruction start condition circuit 401 in FIG. 11 when the output signal SET-START-A of the memory access instruction start condition circuit 404 in FIG. 12 is active, and the output signal A-PIPE-IS-SLOT-K or A-PIPE-IS-SLOT-L of the circuit of FIG. 14 is active, and therefore, the gate 270 is opened. Similarly, the gate control signal START-B shown in FIG. 11 is generated by the memory access instruction start condition circuit 401 when the signal SET-START-B of the memory access instruction start condition circuit 404 is active, and the signal A-PIPE-IS-SLOT-K or A-PIPE-IS-SLOT-L is active, and therefore, the gate 290 is opened.

Figure 16:
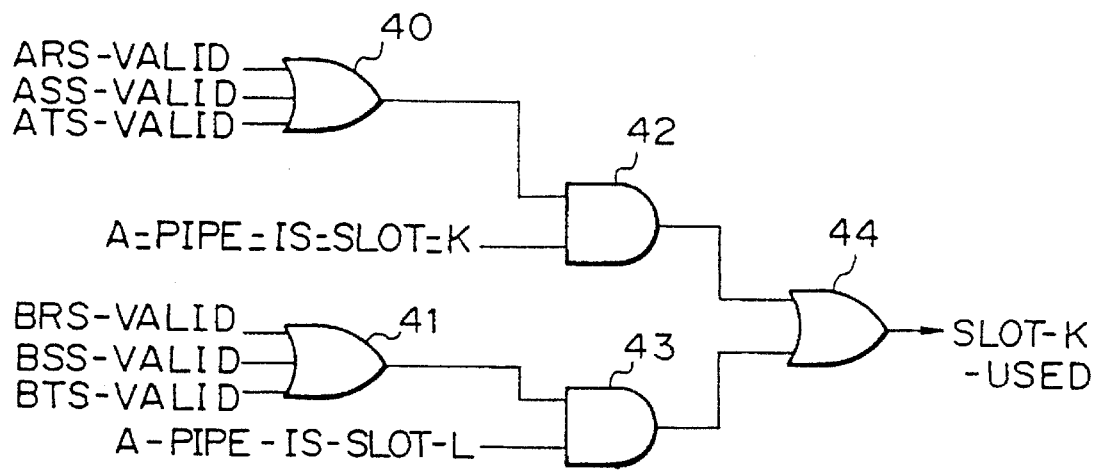
FIG. 16 is a circuit diagram of a construction of a circuit for indicating status of use of the bank slot K by memory access instructions.

FIG. 16 shows a construction of a circuit for indicating status of use of the bank slot K by memory access instructions.

In FIG. 16, reference numeral 40, 41, and 44 each denote an OR gate, and 42 and 43 each denote an AND gate.

The OR gate 40 receives three status signals ARS-VALID, ASS-VALID, and ATS-VALID of the vector instruction registers 271 to 273, and the OR gate 41 receives three status signals BRS-VALID, BSS-VALID, and BTS-VALID of the vector instruction registers 291 to 293. The output of the OR gate 40 is applied to one input terminal of the AND gate 42, and the output of the OR gate 41 is applied to one input terminal of the AND gate 43. The AND gate 42 receives the aforementioned signal A-PIPE-IS-SLOT-K at its other input terminal, and the AND gate 43 receives the aforementioned signal A-PIPE-IS-SLOT-L at its other input terminal, respectively. The outputs of the AND gate 42 and the AND gate 43 are input into the OR gate 44, and thus, a signal SLOT-K-USED, which indicates whether or not the bank slot K is being used by a memory access instruction, is obtained as the output of the OR gate 44.

The three status signals ARS-VALID, ASS-VALID, and ATS-VALID of the vector instruction registers 271 to 273, each indicate whether or not the instruction is held in the register, i.e., whether or not the instruction is executed in the pipeline A, and the three status signals BRS-VALID, BSS-VALID, and BTS-VALID of the vector instruction registers 291 to 293, each indicates whether or not the instruction is held in the register, i.e., whether or not the instruction is executed in the pipeline B. Further, as mentioned in the explanation of the outputs 271 to 273, A-PIPE-IS-SLOT-K and A-PIPE-IS-SLOT-L of the circuit of FIG. 14, an active A-PIPE-IS-SLOT-L signal may indicate that the bank slot K is assigned for the pipeline B in this embodiment, an active output of the AND gate 42 indicates that the bank slot K is assigned for the pipeline A, and an active output of the AND gate 43 indicates that the bank slot K is assigned for the pipeline B. Thus, the output SLOT-K-USED of the OR gate 44 indicates whether or not the bank slot K is being used in the pipeline A or in the pipeline B.

Figure 17:
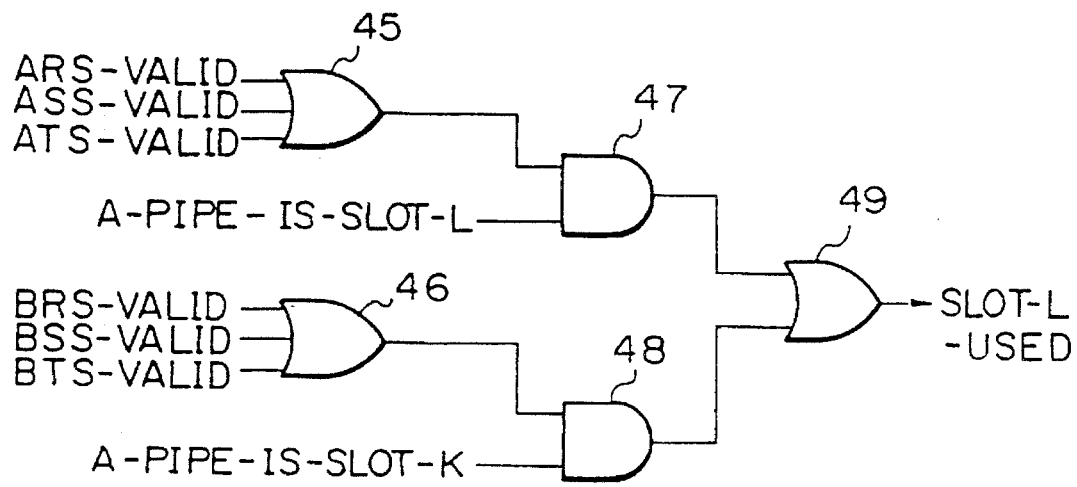
FIG. 17 is a circuit diagram of a construction of a circuit for indicating status of use of the bank slot L by memory access instructions.

Similar to the above, FIG. 17 shows a construction of a circuit for indicating status of use of the bank slot L by memory access instructions.

In FIG. 17, reference numeral 45, 46, and 49 each denote an OR gate, and 47 and 48 each denote an AND gate.

Similar to FIG. 16, the OR gate 45 receives three status signals ARS-VALID, ASS-VALID, and ATS-VALID, and the OR gate 46 receives three status signals BRS-VALID, BSS-VALID, and BTS-VALID. The output of the OR gate 45 is applied to one input terminal of the AND gate 47, and the output of the OR gate 46 is applied to one input terminal of the AND gate 48. The AND gate 47 receives the aforementioned signal A-PIPE-IS-SLOT-L at its other input terminal, and the AND gate 48 receives the aforementioned signal A-PIPE-IS-SLOT-K at its other input terminal, respectively. The outputs of the AND gate 47 and the AND gate 48 are input into the OR gate 49, and thus, a signal SLOT-L-USED, which indicates whether or not the bank slot L is being used by a memory access instruction, is obtained as the output of the OR gate 49.

From the above similarity between the constructions of FIGS. 16 and 17, it is understood that the output SLOT-L-USED of the OR gate 49 indicates whether or not the bank slot L is being used in the pipeline A or in the pipeline B.

The above-mentioned constructions of the memory access instruction start condition circuit 404 in FIG. 12, the non-conflict condition circuit 405 in FIG. 13, the circuit for assigning a bank slot for an instruction and a pipeline in FIG. 14, and the circuits for indicating status of use of the bank slots K and L in FIGS. 16 and 17, constitute the memory access instruction start condition circuit 401 in FIG. 11.

Next, the construction and the operation of the composite calculation instruction start control circuit 402 is explained.

The determination of the composite calculation pipeline used for the composite calculation instruction is made by a composite calculation instruction start condition circuit 406.

Figure 18:
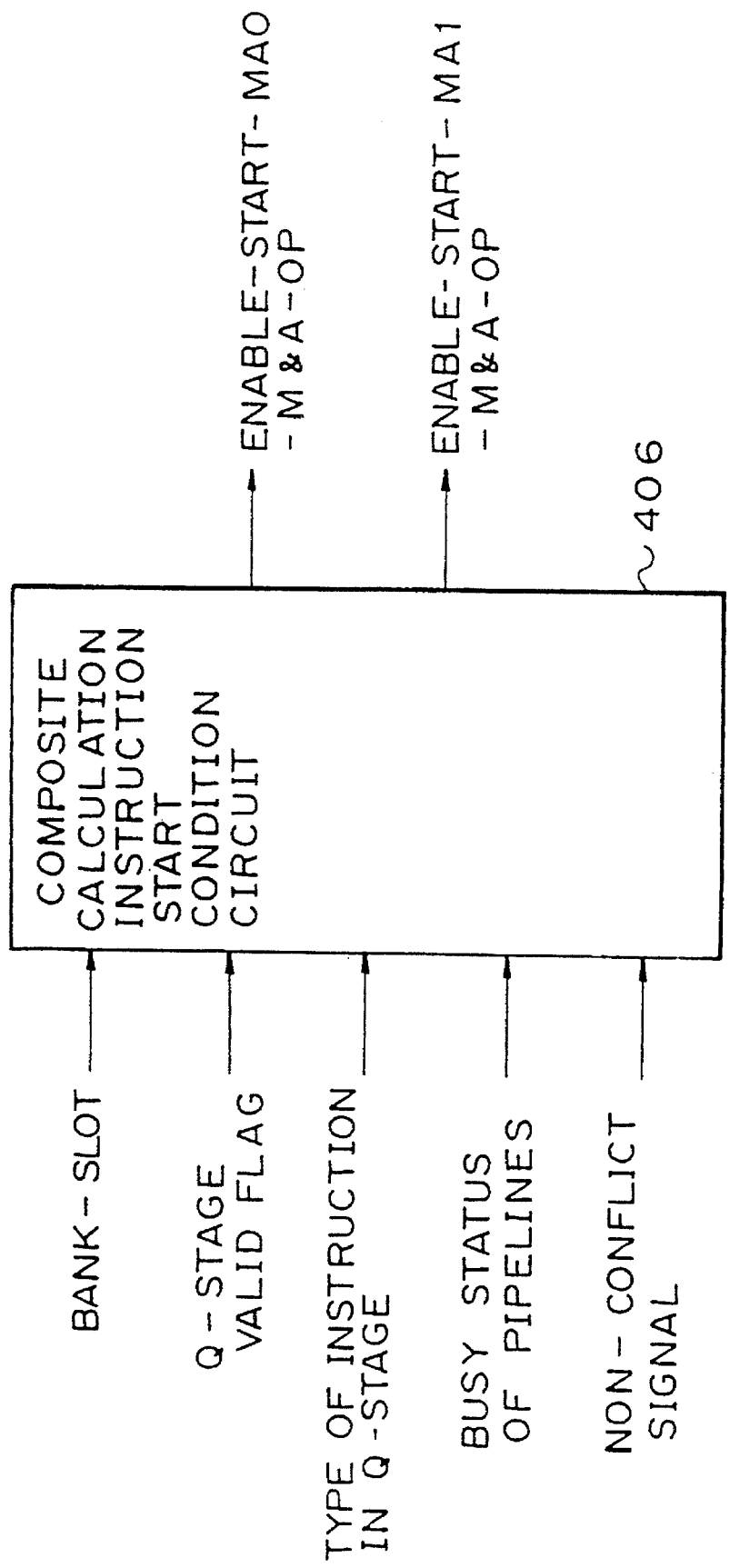
FIG. 18 is a circuit diagram of the input-output relationship of the composite calculation instruction start condition circuit 404, which determines a pipeline to be used for the composite calculation instruction loaded in the vector instruction register (Q) 23 in the vector instruction start queue stage.

FIG. 18 shows the input-output relationship of the composite calculation instruction start condition circuit 406, which determines a pipeline to be used for the composite calculation instruction loaded in the vector instruction register (Q) 23 in the vector instruction start queue stage.

The inputs of the composite calculation instruction start condition circuit 406 are the same as the start condition circuit 404 in FIG. 12, i.e., the timing information for bank slots obtained from the bank slot timing generating circuit 403; a Q-stage valid flag which indicates that a valid instruction is loaded in the vector instruction register (Q) 23 in the vector instruction start queue stage; the type of the vector instruction register (Q) 23, a vector load instruction or a vector store instruction, i.e., the output of the instruction decoder 231; the status of the pipelines in the vector unit (VU) 64, which indicates which pipeline is available; and a signal indicating a conflict status in the addresses in the set of vector registers (VR) 652.

The composite calculation instruction start condition circuit 406 has two outputs, an ENABLE-START-MA0-M&A-OP signal and a ENABLE-START-MA1-M&A-OP signal.

When the aforementioned composite calculation pipeline E is determined to be used for executing the composite calculation instruction, the ENABLE-START-MA0-M&A-OP signal becomes active, and when the aforementioned pipeline F is determined to be used for executing the composite calculation instruction, the ENABLE-START-MA1-M&A-OP signal becomes active.

In the denotations of the above signals, "MA0" indicates a composite calculation pipeline using four successive bank slots E3, E2, E1, and L as shown in FIG. 19, and the denotations of the above signals, "MA1" indicates a composite calculation pipeline using four successive bank slots F3, F2, F1, and K as shown in FIG. 20.

Namely, in the embodiment explained herein, it is assumed that only the above two types "MA0" and "MA1" of successive four bank slots, i.e., (E3, E2, E1, and L) and (F3, F2, F1, and K), respectively, are assigned for a composite calculation instruction (pipeline). Further, in the embodiment explained herein, a fixed correspondence between each of the above type "MA0" of successive four bank slot (E3, E2, E1, and L) and the aforementioned composite calculation pipeline E, and a fixed correspondence between the above type "MA1" of successive four bank slot (F3, F2, F1, and K) and the aforementioned composite calculation pipeline F, are assumed.

In FIGS. 19 and 20, the denotations "R1", "R2M", "R2A", and "R3", each indicate the addresses of the set of vector registers (VR) 652 wherein the data used for the composite calculation is held. The correspondence between the above denotations of the addresses "R1", "R2M", "R2A", and "R3", and the vector data B, C, and D, used for the composite calculation, and the calculation result A, is shown in FIG. 21.

As explained before, the non-conflict signal is obtained from the aforementioned non-conflict condition circuit 405, the input-output relationship of which is shown in FIG. 13.

The composite calculation instruction start condition circuit 406 in FIG. 18 is realized by a hardware logic circuit.

FIGS. 22 to 25 show constructions for obtaining general start control signals for releasing execution of a composite and non-composite calculation instructions using the composite calculation pipelines E and F.

FIG. 22 shows a construction for obtaining a start control signal SET-START-MA0-M&A-OP for releasing an execution of a composite calculation instruction using the pipeline E with the above four successive bank slots (E3, E2, E1, and L).

The construction of FIG. 22 comprises an AND gate 80. The AND gate 80 receives an inverted signal SLOT-L-USED of the aforementioned output signal SLOT-L-USED from the circuit of FIG. 17, and the aforementioned output ENABLE-START-MA0-M&A-OP of the composite calculation instruction start control circuit 406 of FIG. 18, and outputs the above start control signal SET-START-MA0-M&A-OP. The start control signal SET-START-MA0-M&A-OP is then applied to one of input terminals of the OR gate 82 in FIG. 23.

FIG. 23 shows a construction for generating and holding a general start control signal START-MA0 for releasing execution of a composite calculation instruction, a non-composite addition, and a non-composite multiplication using the pipeline E.

As the composite calculation pipelines can be used for execution of non-composite calculations such as an addition or a multiplication, generally, the gates 280 and 300 for the composite calculation pipelines E and F must also be opened for the non-composite calculations using the composite calculation pipelines.

The construction of FIG. 23 comprises an OR gate 82 and a register 84. The above start control signal SET-START-MA0-M&A-OP for releasing an execution of a composite calculation instruction using the pipeline E, a start control signal SET-START-MA0-ADD-OP for releasing an execution of a non-composite addition instruction using the pipeline E, and a start control signal SET-START-MA0-MULTI-OP for releasing an execution of a non-composite multiplication instruction using the pipeline E, are applied to the OR gate 82. The output of the OR gate 82 is latched in the register 84, and then the above general start control signal START-MA0 is obtained as the output of the register 84. The general start control signal START-MA0 is used as a gate control signal of the gate 280 in FIG. 11, i.e., the active start control signal START-MA0 opens the gate 280 in FIG. 11.

Thus, according to the above construction of FIG. 22, only when the above signal SLOT-L-USED is not active, i.e., the bank slot L is not used, the composite calculation instruction using the composite calculation pipeline E can be released to be executed.

Similarly, FIG. 24 shows a construction for obtaining a start control signal SET-START-MA1-M&A-OP for releasing an execution of a composite calculation instruction using the pipeline F with the above four successive bank slots (F3, F2, F1, and K) .

The construction of FIG. 24 comprises an AND gate 81, which receives an inverted signal $\overline{\text{SLOT-K-USED}}$ of the aforementioned output signal SLOT-K-USED from the circuit of FIG. 16, and the aforementioned output ENABLE-START-MA1-M&A-OP of the composite calculation instruction start control circuit 406 of FIG. 18, and outputs the above start control signal SET-START-MA1-M&A-OP. The start control signal SET-START-MA1-M&A-OP is then applied to one of input terminals of the OR gate 83 in FIG. 25.

FIG. 25 shows a construction for generating and holding a general start control signal START-MA1 for releasing execution of a composite calculation instruction, a non-composite addition, and a non-composite multiplication using the pipeline F.

The construction of FIG. 25 comprises an OR gate 83 and a register 85. The above start control signal SET-START-MA1-M&A-OP for releasing an execution of a composite calculation instruction using the pipeline F, a start control signal SET-START-MA1-ADD-OP for releasing an execution of a non-composite addition instruction using the pipeline F, and a start control signal SET-START-MA1-MULTI-OP for releasing an execution of a non-composite multiplication instruction using the pipeline F, are applied to the OR gate 83. The output of the OR gate 83 is latched in the register 85, and then the above general start control signal START-MA1 is obtained as the output of the register 85. The general start control signal START-MA1 is used as a gate control signal of the gate 300 in FIG. 11, i.e., the active start control signal START-MA1 opens the gate 300 in FIG. 11.

Thus, similar to FIG. 22, according to the above construction of FIG. 24, only when the above signal SLOT-K-USED is not active, i.e., the bank slot K is not used, the composite calculation instruction using the composite calculation pipeline F can be released to be executed.

Figure 26:
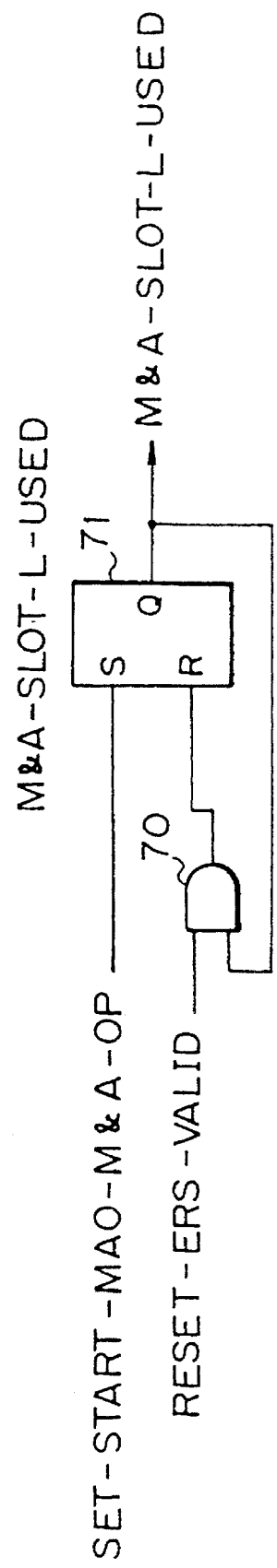
FIG. 26 is a circuit diagram of a construction of a circuit for indicating status of use of the bank slot L by the composite calculation pipeline E.

FIG. 26 shows a construction of a circuit for indicating status of use of the bank slot L by the composite calculation pipeline E.

In FIG. 26, reference numeral 70 denotes an AND gate, and 71 denotes an SR-type flip-flop circuit.

The SR-type flip-flop circuit 71 receives the above-mentioned start control signal SET-START-MA0-M&A-OP at its set input terminal S, and an output of the AND gate 70 at its reset input terminal R. The AND gate 70 receives a read stage register reset signal RESET-ERS-VALID of the composite calculation pipeline E at one input terminal, and the Q output of the SR-type flip-flop circuit 71 at the other input terminal.

The SR-type flip-flop circuit 71 in FIG. 26 is set when the above-mentioned start control signal SET-START-MA0-M&A-OP is applied, and is reset when the above-mentioned read stage register reset signal RESET-ERS-VALID is applied.

The above read stage register reset signal RESET-ERS-VALID becomes active when reading operations by the pipeline E for all the elements used for execution of an instruction are completed, and the active read stage register reset signal RESET-ERS-VALID indicates that the use of the register 281 in the read stage for the execution of the preceding instruction is completed, and the register 281 in the read stage is available for the execution of a following instruction.

Therefore, the output M&A-SLOT-L-USED of the circuit of FIG. 26 is active while the corresponding pipeline E is being used for execution of an instruction, and is reset when the execution is completed in its read stage.

Figure 27:
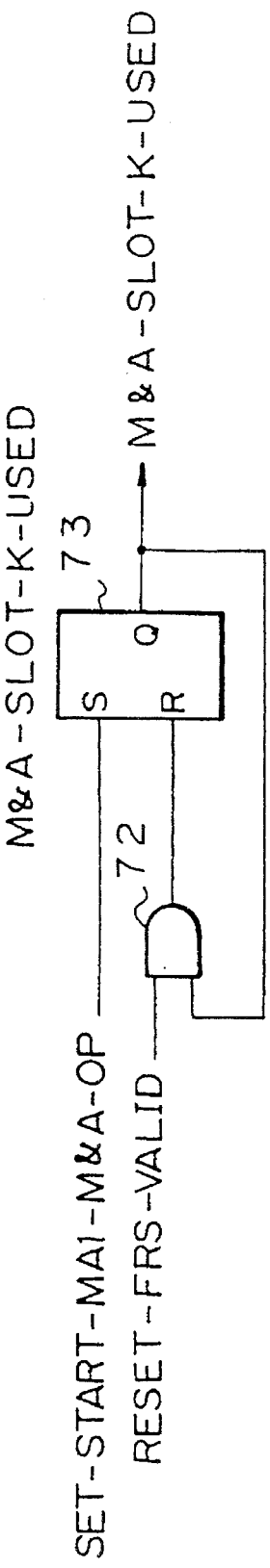
FIG. 27 is a circuit diagram of a construction of a circuit for indicating status of use of the bank slot K by the composite calculation pipeline F.

Similarly, FIG. 27 shows a construction of a circuit for indicating status of use of the bank slot K by the composite calculation pipeline F.

In FIG. 27, reference numeral 72 denotes an AND gate, and 73 denotes an SR-type flip-flop circuit.

The SR-type flip-flop circuit 73 receives the above-mentioned start control signal SET-START-MA1-M&A=OP at its set input terminal S, and an output of the AND gate 72 at its reset input terminal R. The AND gate 72 receives a read stage register reset signal RESET-FRS-VALID of the composite calculation pipeline F at one input terminal, and the Q output of the SR-type flip-flop circuit 73 at the other input terminal.

The SR-type flip-flop circuit 73 in FIG. 27 is set when the above-mentioned start control signal SET-START-MA 1-M&A-OP is applied, and is reset when the above-mentioned read stage register reset signal RESET-FRS-VALID is applied.

The above read stage register reset signal RESET-FRS-VALID becomes active when reading operations by the pipeline F for all the elements used for execution of an instruction are completed, and the active read stage register reset signal RESET-FRS-VALID indicates that the use of the register 301 in the read stage for the execution for the preceding instruction is completed, and the register 301 in the read stage is available for the execution of a following instruction.

Therefore, the output M&A-SLOT-K-USED of the circuit of FIG. 27 is active while the corresponding pipeline F is being used for execution of an instruction, and is reset when the execution is completed in its read stage.

As mentioned before with reference to FIGS. 12 and 14, the above-mentioned output signals M&A-SLOT-L-USED and M&A-SLOT-K-USED of the constructions of FIGS. 26 and 27 are input into the memory access instruction start condition circuit 404 of FIG. 12, and the bank slot determination circuit 50 shown in FIG. 14.

In the memory access instruction start control circuit 401 of FIG. 11, the above signals M&A-SLOT-L-USED and M&A-SLOT-K-USED are used for determining whether or not the pipeline A can be used for a newly-received memory access instruction, and whether or not the pipeline B can be used for a newly-received memory access instruction.

Herein, how the above-mentioned signals M&A-SLOT-L-USED and M&A-SLOT-K-USED are used for determining the availability of each of the pipelines A and B, are explained with reference to FIGS. 28 and 29.

Figure 28:
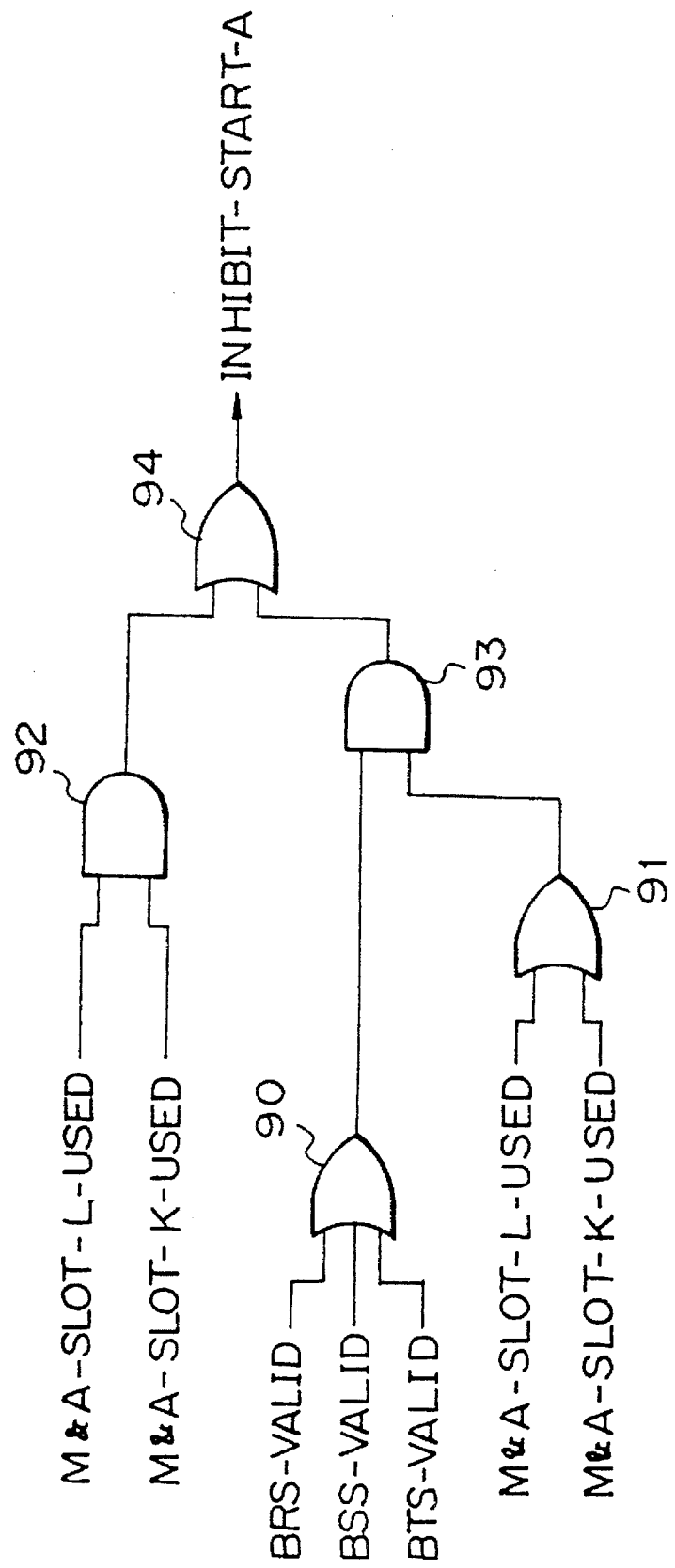
FIG. 28 is a circuit diagram of a construction of a circuit for obtaining a signal INHIBIT-START-A indicating an inhibition status of the use of the pipeline A.

FIG. 28 shows a construction of a circuit for obtaining a signal indicating an inhibition status of the use of the pipeline A.

In FIG. 28, reference numeral 90, 91, and 94 each denote an OR gate, and 92 and 93 each denote an AND gate.

In the construction of FIG. 28, both the AND gate 92 and the OR gate 91 each receive both the above-mentioned signals M&A-SLOT-L-USED and M&A-SLOT-K-USED in its own input terminals, and the aforementioned three status signals BRS-VALID, BSS-VALID, and BTS-VALID, each of which indicates whether or not the instruction is held in the vector instruction registers 291 to 293, i.e., whether or not the instruction is executed in the pipeline B, are applied to the input terminals of the OR gate 90. The output of the OR gates 90 and 91 are applied to the input terminals of the AND gate 93. The output of the AND gates 92 and 93 are applied to the input terminals of the OR gate 94. Thus, a signal INHIBIT-START-A indicating an inhibition status of the use of the pipeline A is obtained as the output of the OR gate 94.

In the above construction: the output of the OR gate 90 indicates whether or not the pipeline B is being used; the output of the OR gate 91 indicates whether or not at least one of the signals M&A-SLOT-L-USED and M&A-SLOT-K-USED is active; the output of the AND gate 92 indicates whether or not both the signals M&A-SLOT-L-USED and M&A-SLOT-K-USED are active; the output of the AND gate 93 indicates whether or not one of the bank slots K and L is being used for a composite calculation instruction, and at the same time, the other of the bank slots K and L is being used for the memory access pipeline B; and thus the output of the OR gate 94 indicates whether or not at least one of the bank slots K and L is available for the use by the pipeline A.

Figure 29:
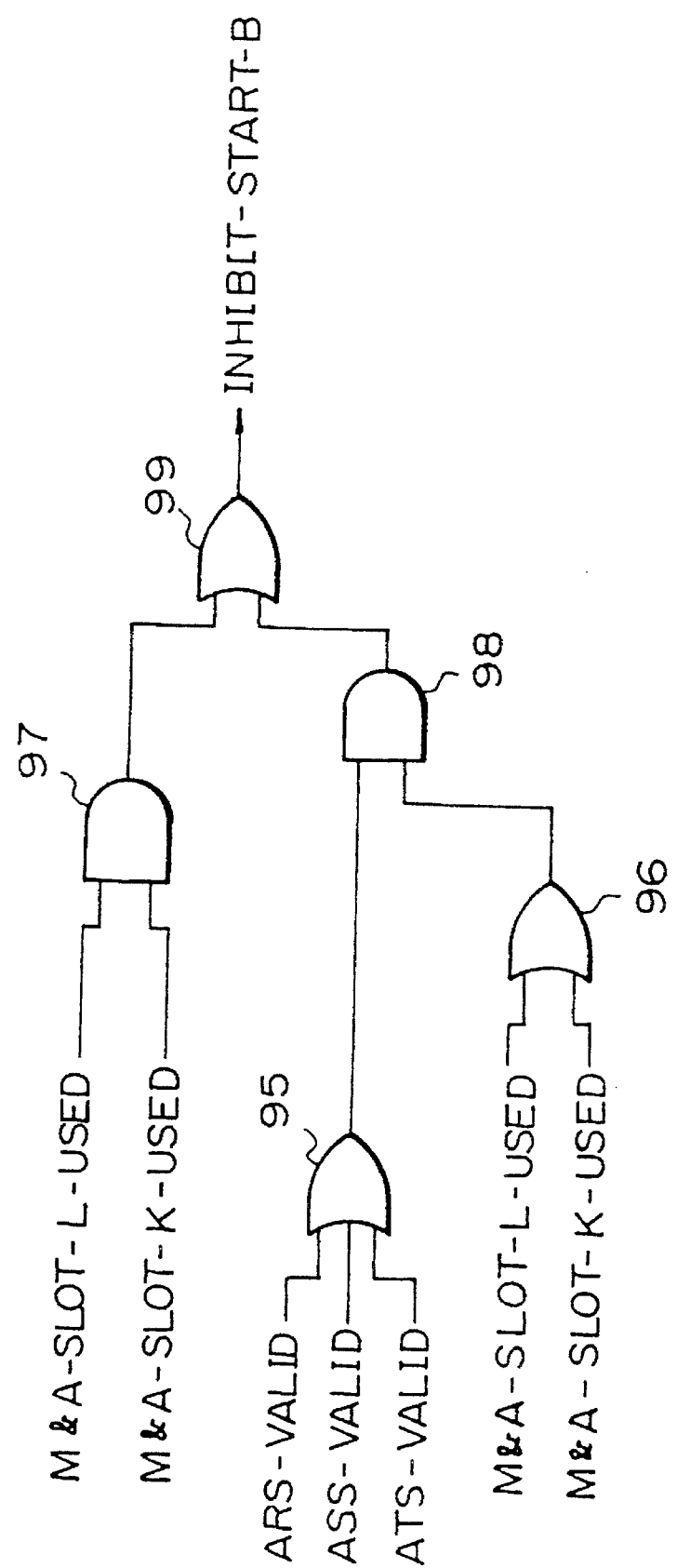
FIG. 29 is a circuit diagram of a construction of a circuit for obtaining a signal INHIBIT-START-B indicating an inhibition status of the use of the pipeline B.

Similarly, FIG. 29 shows a construction of a circuit for obtaining a signal INHIBIT-START-B indicating an inhibition status of the use of the pipeline B.

In FIG. 29, reference numeral 95, 96, and 99 each denote an OR gate, and 97 and 98 each denote an AND gate.

In the construction of FIG. 29, both the AND gate 97 and the OR gate 96 each receive both the above-mentioned signals M&A-SLOT-L-USED and M&A-SLOT-K-USED in its own input terminals, and the aforementioned three status signals ARS-VALID, ASS-VALID, and ATS-VALID, each of which indicates whether or not the instruction is held in the vector instruction registers 271 to 273, i.e., whether or not the instruction is being executed in the pipeline A, are applied to the input terminals of the OR gate 95. The output of the OR gates 95 and 96 are applied to the input terminals of the AND gate 98. The output of the AND gates 97 and 98 are applied to the input terminals of the OR gate 99. Thus, a signal INHIBIT-START-B indicating an inhibition status of the use of the pipeline B is obtained as the output of the OR gate 99.

In the above construction: the output of the OR gate 95 indicates whether or not the pipeline A is being used; the output of the OR gate 96 indicates whether or not at least one of the signals M&A-SLOT-L-USED and M&A-SLOT-K-USED is active; the output of the AND gate 97 indicates whether or not both the signals M&A-SLOT-L-USED and M&A-SLOT-K-USED are active; the output of the AND gate 98 indicates whether or not one of the bank slots K and L is being used for a composite calculation instruction, and at the same time, the other of the bank slots K and L is being used for the memory access pipeline A; and thus the output of the OR gate 99 indicates whether or not at least one of the bank slots K and L is available for the use by the pipeline B.

FIG. 30 shows a timing when a composite calculation instruction is executed in the composite calculation pipeline E. In FIG. 30, $(R3)_k$, $(R2M)_k$, and $(R2A)_k$, are elements of vector data C, B, and D shown in FIG. 21, which are read in the timing k. In FIG. 30, a resulting element obtained by the composite calculation from the elements of vector data which have been read in the preceding time k−r is written in the time k through the bank slot E1.

Figure 31:
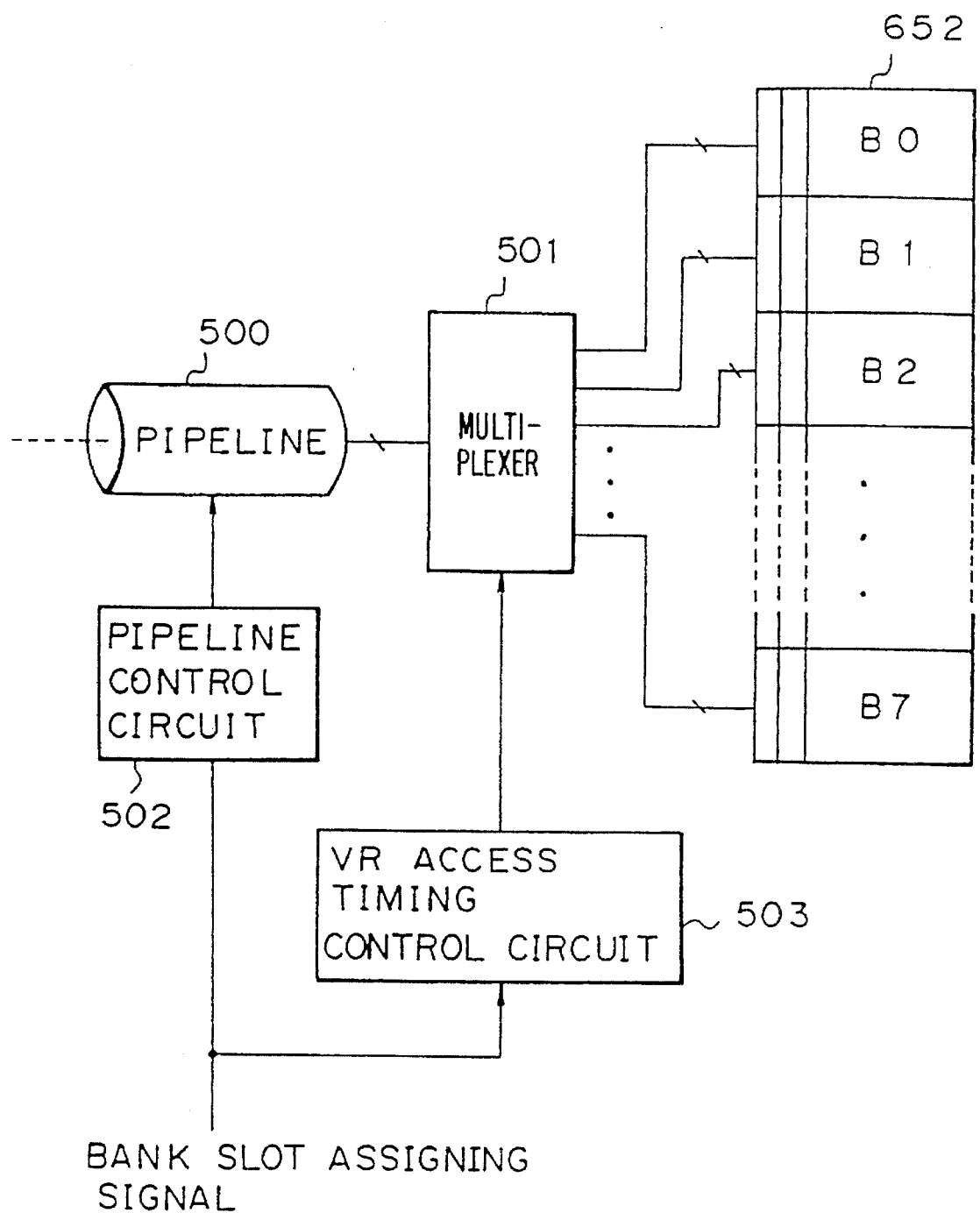
FIG. 31 is a block diagram of an example of the construction enabling a cyclical access to each bank of the set of vector registers (VR) 652 by a pipeline.

FIG. 31 shows an example of the construction enabling the aforementioned cyclical access to each bank of the set of vector registers (VR) 652 by a pipeline.

In FIG. 31, reference numeral 500 denotes a pipeline, 501 denotes a multiplexer, 502 denotes a pipeline control circuit, 503 denotes a vector register access timing control circuit.

The pipeline control circuit 502 represents a general function for controlling the pipeline 500 of all the functions of the vector control unit (VCU) 66. The multiplexer 501 cyclically connects the access port of the pipeline 500 with the corresponding port of each bank of the set of vector registers (VR) 652, according to a control of the vector register access timing control circuit 503.

When a bank slot is assigned for the pipeline 500, the information of the assigned bank slot is supplied to the pipeline control circuit 502 and the vector register access timing control circuit 503 controls the above connection between the pipeline 500 and the banks of the set of vector registers (VR) 652 based on the information.

Although it is not shown, generally, the information of bank slot which is assigned for execution of an instruction in a pipeline is held in the form of a flag with the instruction code held in the aforementioned registers in each of the read, startup, and pipeline terminate stages in the vector control unit (VCU) 66 during the execution.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

We claim:

1. A vector data processing apparatus for receiving and executing vector instructions, including vector load instructions which instruct an operation including access to a main storage, said vector data processing apparatus comprising:

said main storage unit for storing data;

a set of vector registers, each vector register arranged in a plurality of banks, each bank being simultaneously and independently accessible;

at least one memory access pipeline for transferring the data between said main storage and said set of vector registers as specified by vector load instructions, selected data being transferred as specified by a respective vector load instruction when the respective vector load instruction is received by the vector data processing apparatus; and vector unit control means for controlling cyclical accessing to the plurality of banks of said vector registers, by the at least one memory access pipeline, said vector unit control means further comprising:

vector load instruction detecting means for detecting reception of a vector load instruction by one of the at least one vector load pipeline, and for outputting a memory access detection signal in response to the detection of said vector load instruction, time slot timing generating means for generating a time slot timing signal, indicative of timings of cyclical time slots through which said cyclical accessing to the plurality of banks of said vector register is allowed, and outputting said time slot timing signal, model information storing means for storing model information obtained in advance of operation of said vector processing apparatus, said model information being data specific to said vector data processing apparatus, being indicative of a minimum time required to fetch said data from said main storage unit for writing said transferred data in one of said plurality of banks of said vector registers, said model information for determining an optimum time slot among time slots other than those used for other pipelines for each possible time at which said vector load detection signal can be received, and instruction time slot assigning means for receiving said vector load detection signal, said model information, and said time slot timing signal, and for assigning, at a time of memory access, said optimum time slot to said vector load instruction which is detected by the vector load instruction detecting means, based on a time at which said vector load detection signal is received by said instruction time slot assigning means with respect to the timings indicated by said time slot timing signal, and referring to said model information.

2. A vector data processing apparatus for receiving and executing vector instructions, as recited in claim 1, said vector unit control means further comprising:

time slot status indicating means for determining if each of said cyclical time slots is currently assigned to a previously received vector load instruction which uses one of said at least one memory access pipeline, and for producing a time slot indicator signal indicative of which cyclical time slots are assigned to said previously received vector load instruction, wherein said instruction time slot assigning means further receives said time slot indicator signal, and assigns a cyclical time slot to said received vector load instruction based on said time slot indicator signal, said model information, and said time at which said vector load detection signal is received by said time slot assigning means with respect to the timings indicated by said time slot timing signal.

3. An apparatus as recited in claim 1, wherein each of said at least one memory access pipeline can simultaneously, cyclically access each of the plurality of banks of said vector registers.

* * * * *

UNITED STATES PATENT AND TRADEMARK OFFICE
CERTIFICATE OF CORRECTION

PATENT NO. : 5,539,902
DATED : July 23, 1996
INVENTOR(S) : Kenichi SAKAI, et al.

It is certified that error appears in the above-indentified patent and that said Letters Patent is hereby corrected as shown below:

Column 9, line 17, delete "unit" (first occurrence)
Column 14, line 64, "denotes" should be --denote--;
line 65, "denotes" should be --denote--.

Signed and Sealed this

Twenty-fourth Day of December, 1996

Attest:

BRUCE LEHMAN

*Attesting Officer*   *Commissioner of Patents and Trademarks*